United States Patent [19]

Leet

[11] 4,309,917
[45] Jan. 12, 1982

[54] TRANSMISSION AND CONTROL SYSTEM

[75] Inventor: Warren E. Leet, Lizton, Ind.

[73] Assignee: General Motors Corporation, Detroit, Mich.

[21] Appl. No.: 102,625

[22] Filed: Dec. 11, 1979

[51] Int. Cl.³ .................. B60K 41/06; F16H 47/04
[52] U.S. Cl. .................................. 74/861; 74/856; 74/687; 74/752 C; 74/869
[58] Field of Search ............... 74/856, 857, 859, 860, 74/861, 862, 869, 752 C, 687

[56] References Cited

U.S. PATENT DOCUMENTS

| | | | |
|---|---|---|---|
| 2,762,384 | 9/1956 | Rosenberger | 137/51 |
| 3,093,010 | 6/1963 | Spreitzer et al. | 74/472 |
| 3,274,946 | 9/1966 | Simmons | 103/161 |
| 3,300,000 | 1/1967 | Stoyke | 74/857 X |
| 3,470,769 | 10/1969 | Livezey | 74/687 X |
| 3,477,225 | 11/1969 | Cryder et al. | 74/862 X |
| 3,492,891 | 2/1970 | Livezey | 74/687 X |
| 3,538,790 | 11/1970 | Polak | 74/687 X |
| 3,583,154 | 6/1971 | Utter | 60/19 |
| 3,590,577 | 7/1971 | Utter | 60/19 |
| 3,590,658 | 7/1971 | Tuck | 74/687 |
| 3,596,535 | 8/1971 | Polak | 74/687 X |
| 3,611,838 | 10/1971 | Utter | 74/868 |
| 3,640,157 | 2/1972 | Schaeffer | 74/869 |
| 3,733,931 | 5/1973 | Nyman et al. | 74/687 X |
| 3,752,010 | 8/1973 | Tipping | 74/687 |
| 3,927,528 | 12/1975 | van der Kolk et al. | 74/859 X |
| 3,982,448 | 9/1976 | Polak et al. | 74/687 |
| 4,111,073 | 9/1978 | Chana | 74/859 X |
| 4,193,323 | 3/1980 | Bubula et al. | 74/733 |
| 4,246,806 | 1/1981 | Reynolds et al. | 74/869 |

FOREIGN PATENT DOCUMENTS 1255389 11/1967 Fed. Rep. of Germany ........ 74/857
1450695 4/1969 Fed. Rep. of Germany ........ 74/857

*Primary Examiner*—Leslie Braun
*Attorney, Agent, or Firm*—Saul Schwartz

[57] ABSTRACT

A cross drive transmission having a hydromechanical propulsion drive and hydrostatic steer drive. In the controls, a ratio governor has a set speed control wherein set speed is established in accordance with throttle position, steer request, engine power and brake torque. Advance and return signals regulate the speed ratio of the hydromechanical drive so input speed equals the set speed. A rate of change control provides fast increase of the return signal, slow increase of the advance signal in higher ratios and very slow increase of the advance signal in low ratio. Manual controls, return and advance signal control valves, shift signal valves and shift valves, in neutral, provide substantially zero displacement in the hydrostatic unit and neutral in the gear unit, and, in drive positions, coordinate hydrostatic ratio control and gear ratio control for continuous variable ratio change in the hydromechanical propulsion drive. Overpressure in the propulsion hydrostatic unit controls the ratio governor to provide only a return signal and disengages all gear ratio drives until output speed is reduced to a low value and hydrostatic unit displacement is reduced substantially to zero for smooth reengagement of drive. Underpressure in the hydrostatic steer drive disables the steer controls. The steer controls are also disabled at low engine speeds and low engine power so steer load does not stall the engine and in neutral manual range to prevent inadvertent steering.

6 Claims, 10 Drawing Figures

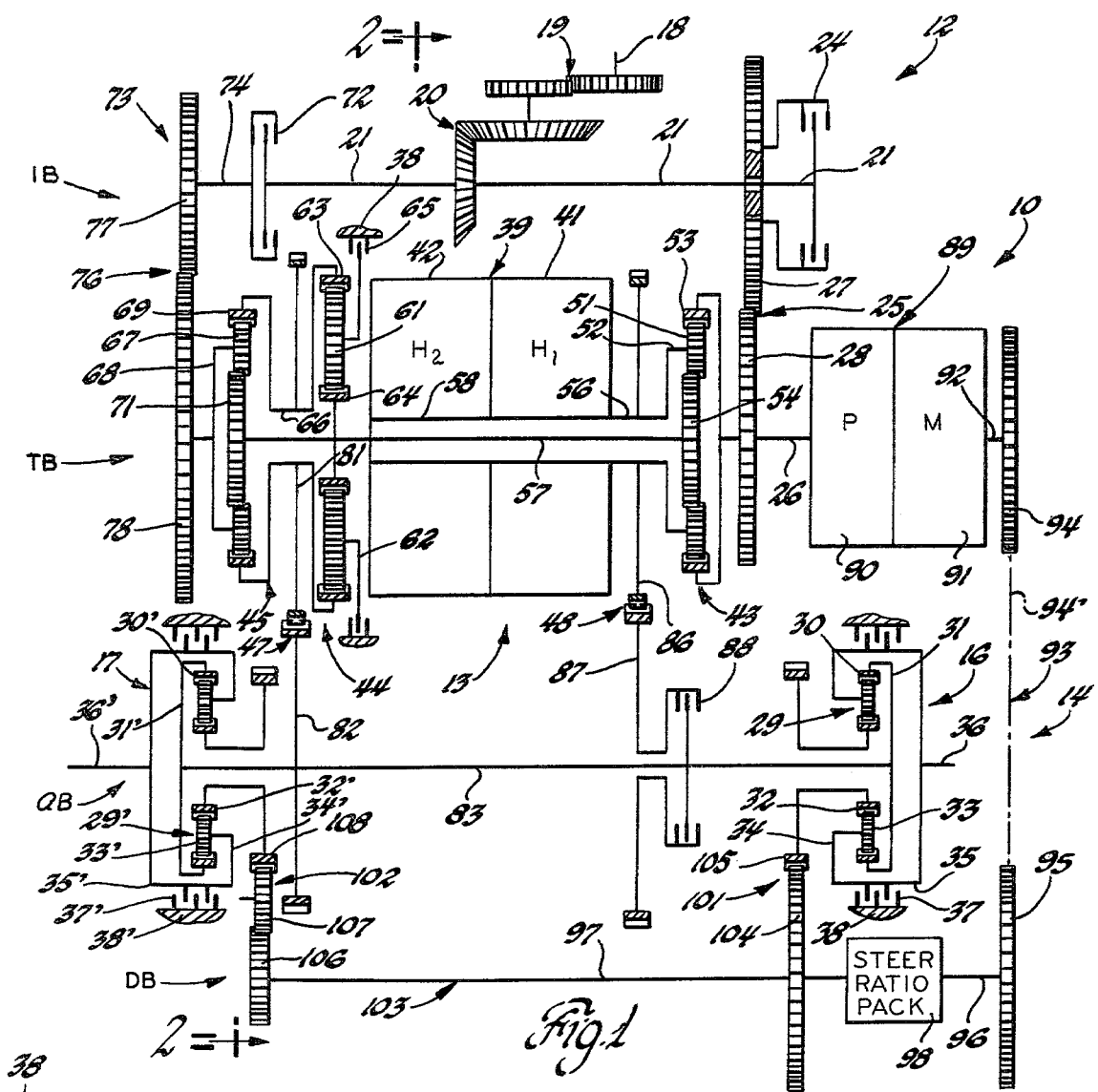
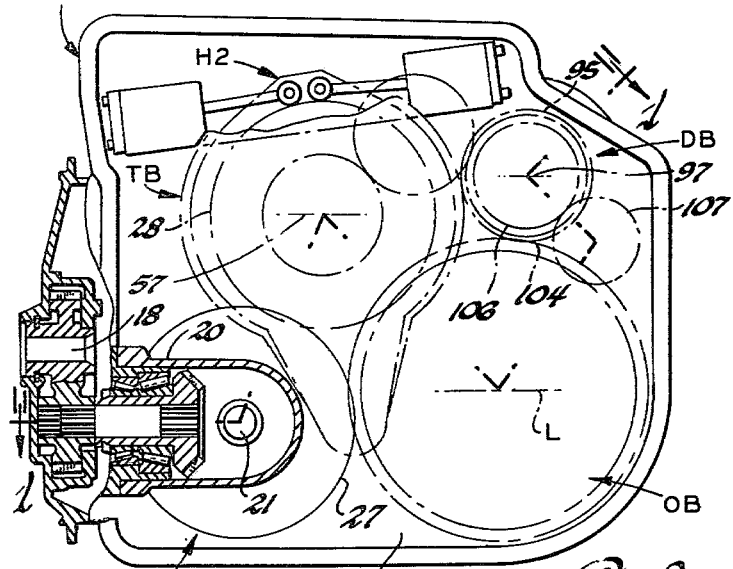
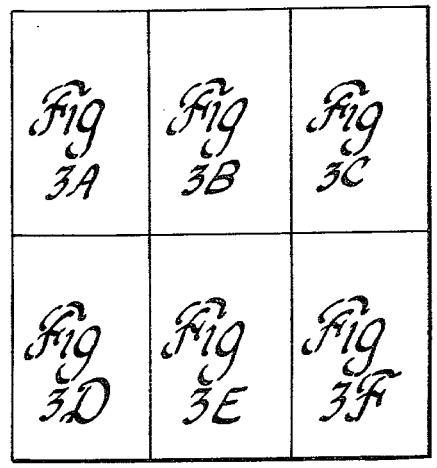
Fig. 1
Fig. 2
Fig. 3

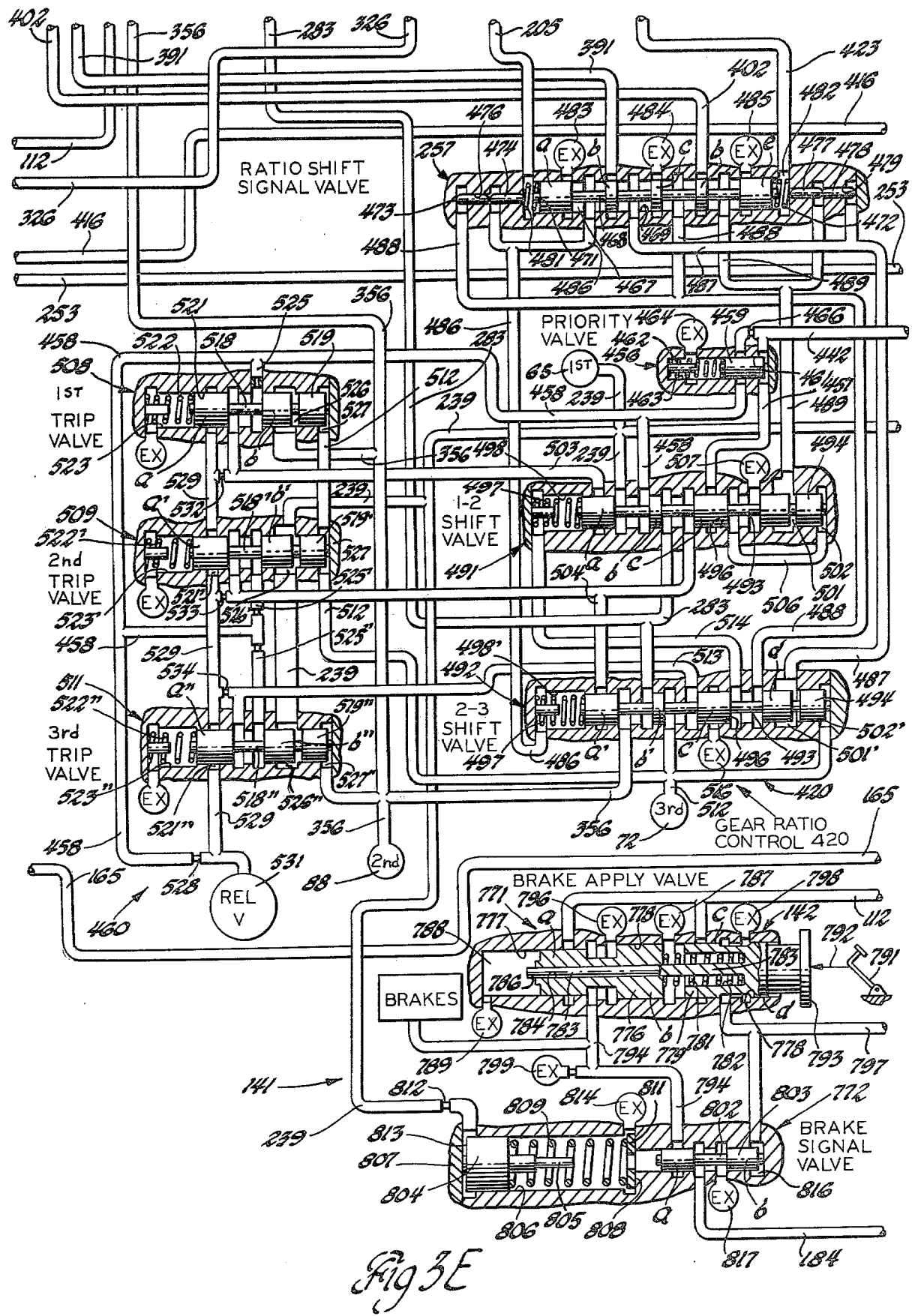

TRANSMISSION AND CONTROL SYSTEM

The invention hereindescribed was made in the course of work performed under a contract or subcontract thereunder with the United States Department of the Army.

FIELD OF INVENTION

This invention relates to transmissions and controls therefor and, particularly, cross drive hydromechanical transmissions and controls therefor.

RELATED APPLICATIONS

Commonly assigned U.S. Patent Applications Ser. NO. 051,109 now U.S. Pat. No. 4,258,548 in the names of Arthur Hall III and Warren E. Leet; and Ser. No. 051,110 now U.S. Pat. No. 4,244,279 in the names of Max E. Stewart and James R. Lucas, filed concurrently on June 22, 1979, are related applications.

BACKGROUND OF INVENTION

A related cross drive transmission and controls therefor are shown in U.S. Pat. No. 3,611,838 Robert C. Utter, granted Oct. 12, 1971. A related hydromechanical transmission is shown in U.S. Pat. No. 3,982,448 James C. Polak and Phillip J. Ross, granted Sept. 28, 1976. Related hydrostatic transmissions and units thereof are shown in U.S. Pat. Nos. 3,274,946 Edw. E. Simmons, granted Sept. 27, 1966 and 3,752,010 R. G. Tipping, granted Aug. 14, 1973. The type of modulator valve used is shown in U.S. Pat. No. 3,093,010 W. M. Spreitzer et al., granted June 11, 1963. Speed governors, as shown in U.S. Pat. No. 2,762,384 Rosenberger, granted Sept. 11, 1956, are used. A related ratio governor is shown in U.S. Pat. No. 3,583,154 Robt. C. Utter, granted June 8, 1971. Manual electric controls are shown in U.S. Pat. No. 3,640,157 Robt. H. Schaefer, granted Feb. 8, 1972. A related zero stroke bias valve is shown in U.S. Pat. No. 3,590,577 Robt. C. Utter, granted July 6, 1971.

SUMMARY OF INVENTION

The cross drive transmission has a hydromechanical propulsion drive and a hydrostatic steer drive, both being driven by an input drive and driving right and left differential output drives for straight propulsion drive and differential steer drive. The hydromechanical propulsion drive is a multispeed (preferably with three ratio ranges) hydromechanical, synchronous shifting transmission providing continuously variable ratio change. The steer drive is a continuously variable ratio transmission, such as a hydrostatic transmission. The input drive barrel and the output drive barrel, both of which displace a small volume of fluid, are located in the bottom of the housing. The hydromechanical propulsion transmission and hydrostatic steer transmission barrel is located above these input and output barrels so the sump in the bottom of the housing has a large fluid capacity volume at low fluid levels.

This control system is designed for use with a propulsion hydromechanical transmission in which the motor of the hydrostatic portion of the drive provides driving torque during one drive ratio and reaction torque during another drive ratio, and wherein its shifts from one ratio to another are designed to be synchronized. The hydraulic ratio of this transmission is controlled by varying the displacement of a variable displacement pump and motor. In synchronous shifting hydromechanical transmissions, the gearing is designed so that the engaging friction members of the oncoming friction device for establishing 2nd and higher ratio ranges have slightly different rotational speeds before and after the shift to accommodate the exchange of efficiencies in the hydrostatic drive by a small change of motor speed for improved synchronization.

The manual control, on a shift from neutral to pivot steer or forward and reverse drive positions, controls a disconnect valve to establish disconnect clutch drive to the propulsion and steer drives and to make the steer controls operational. The manual control, on a shift from neutral or pivot steer to forward or reverse drive positions, controls the neutral valve to also connect the advance signal so both the advance and return signals are connected to the propulsion hydrostatic control, and supplies the shift valves so both the propulsion hydrostatic and ratio shift controls are operational. Also, the forward and reverse valves, in forward and reverse manual positions, respectively provide forward and reverse signals. In forward and reverse drive, in 1st ratio, the return signal is connected to a return signal valve and a zero stroke bias valve to the actuator, and the advance signal is connected by the advance signal valve to the actuator for changing pump and motor displacement. In 2nd and 3rd ratio, the return signal is connected by the return signal valve to the advance signal control valve which supplies both return and advance signals to the actuator for changing both pump and motor displacement. The advance signal control valve reverses the connections in 2nd and reverse ratio range to provide reversed displacement change relative to input speed.

To accomplish the above shift requirement, a motoroperated shift signal valve has a spool operatively connected for movement with the displacement member of the hydrostatic motor to provide a 1-2-1 shift signal at the desired motor displacement for 1-2-1 shifting. A similar pump-operated shift signal valve provides a 2-3-2 shift signal at the desired pump displacement for 2-3-2 shifting. These 1-2-1 and 2-3-2 shift signals are connected by a ratio shift signal valve in upshift or downshift positions respectively in response to the advance or return signal to provide 1-2 and 2-3 upshifts and 2-1 and 3-2 downshift signals to control shift valves to effect such shifts. The shift valves lock in upshift position until a downshift signal effects a downshift.

A plurality of exhaust trip valves are associated with the shift valves, providing a restricted exhaust and restricted supply to maintain the off-going friction device pressurized until the oncoming friction device has sufficient engagement pressure to carry the torque and to discontinue the restricted supply.

A ratio governor is responsive to input speed, compares input speed to a varied desired set speed, and operates as a regulator to provide equal low pressure advance and return signals on a speed match, to quickly increase the advance signal to maximum value and reduce the return signal to zero on overspeed, and to quickly increase the return signal and reduce the advance signal to zero on underspeed, to control pump and motor displacement to maintain input speed at the set speed. These signals are distributed by the control system to an actuator which controls the movement of servo valves and hydraulic servos to control the displacement member of the hydraulic pump and motor. The ratio governor signals are supplied to the ratio shift signal valve which is positioned with hysteresis in an upshift or a downshift position, depending on the signal emitted by the ratio governor, for controlling the ratio range shift valves.

In the ratio governor, the set speed is controlled by a plurality of vehicle, engine, transmission, and brake operation signals, and the rate of change of the advance and return signals is controlled for improved governor operating characteristics or stability. The set speed is varied from a low speed-such as engine idle speed, to a high or maximum engine speed, by control signals proportional to each of leading torque demand-such as the degree of throttle position; steer demand-such as the degree of steer lever movement from straight drive position; engine power or substantially simultaneous torque demand-such as compressor discharge pressure from a gas turbine engine; and vehicle brake demand-such as vehicle brake apply pressure. The set speed will be the highest set speed called for by any one of these control signals.

In drive operation during acceleration, increasing throttle, in a low-throttle range, will increase the set speed to an intermediate value. Then, as engine power increases to a high or maximum value, the set speed is increased to the maximum. As throttle is decreased for deceleration, the lagging decreasing engine power signal controls the set speed. Full throttle and maximum engine power may increase the set speed to the same maximum value. The steer demand increases the set speed to a higher value to maintain higher engine speed, even though throttle and engine power are low, to maintain a greater degree of steer capability. During braking in higher ratio ranges, the brake demand increases the set speed to a higher value for increased engine braking.

To avoid a "stumble" effect as the vehicle speed slows to zero, the vehicle brake apply signal is fed through a brake signal valve which blocks feed of the vehicle brake apply signal to the ratio governor in 1st ratio range. To ensure a smooth set speed transition to idle as 1st ratio range engages during a vehicle brake stop, the 1st range signal to the brake signal valve is fed through a restriction into an actuator chamber for accumulator operation delaying the transition. The vehicle brake apply signal thus has a modulated transition from maximum to zero signal value at a controlled rate to provide a smooth set speed reduction.

During normal operation, the advance and return signals are connected through an advance cut-off valve and a rate of change control to provide ratio governor system stability and smooth ratio change. To obtain these advantages, the return signal, which is provided in response to any request for a reduction in ratio, is supplied rapidly by full-flow lines to quickly provide full pressure for fast reduction of the ratio of the propulsion drive provided by the propulsion hydromechanical transmission. Also, for fast reduction of ratio, the advance line is rapidly exhausted by a full-flow line. When the advance signal is provided to increase ratio, it is supplied slowly by a restricted line for slowed increase of the ratio, and the return line is exhausted slowly by a restricted line.

Since the hydrostatic ratio change in 1st ratio range operation provides a larger percentage change in speed, the transmission is more sensitive to rate of change of ratio. Thus, to provide optimum ratio change stability and shift smoothness in lower ratio ranges such as 1st ratio range, the rate of increase in the advance signal is further decreased by including a second restriction in the advance line. This system provides an advance signal rate of change increasing with increasing gear speed ratio or ratio range.

The transmission has the capability to decrease the steering radius to the sharpest turn, pivot steer, and the steer hydrostatic transmission has a large power capacity. Since a steer request for a sharp turn at low engine speed, such as idle, may stall the engine, the steer request controls include a system to prevent stalling the engine at low input speed. The manual steer request linkage includes a steer override link which, when supplied with fluid pressure by a steer inhibitor or signal valve, transmits steer request to the steer servo valve. At low speeds, the steer signal valve cuts off fluid pressure supply to the steer override link so it does not transmit steer request. The fluid pressure supply to the steer signal valve is cut off by a regulator valve in response to abnormally low minimum charging pressure in the steer hydrostatic transmission to prevent steering. The manual control for neutral controls the steer signal valve to prevent steer.

The propulsion hydromechanical transmission has in the hydrostatic transmission portion, an overpressure protection system for limiting high hydrostatic pressure which includes a stroke limiter control operative in response to overpressure of high hydrostatic pressure to limit stroke to limit high hydrostatic pressure and a drive control operative in higher ratio ranges, 2nd and 3rd, in response to overpressure of high hydrostatic pressure, even though the stroke limiter control is operating, to an overpressure cut-off valve to cut off the mainline feed to all the ratio-establishing devices to place the transmission in neutral and to lock in this cut-off mode substantially until stroke is zero and output governor pressure and speed are zero and then unlocking so operation of the ratio controls may be resumed with normal 1st ratio range starting operation. Also in this cut-off mode, the overpressure cut-off valve provides a return demand signal. Also lower than normal charging or low kidney pressure in the propulsion hydrostatic transmission also provides a return demand signal. Both of these return demand signals control an advance cut-off valve of the ratio governor to cut off the advance signal and continuously provide a return signal.

These and other features and advantages of this invention will be more apparent from the following description and accompanying drawings.

BRIEF DESCRIPTION OF DRAWINGS

FIG. 1 is a gear schematic of the cross drive transmission on line 1—1 of FIG. 2.

FIG. 2 is a cross-sectional view, with portions broken away, of the cross drive transmission gearing.

FIG. 3 is a block diagram showing the relative positions of FIGS. 3A, 3B, 3C, 3D, 3E, and 3F.

FIGS. 3A, 3B, 3C, 3D, 3E, and 3F, when arranged as shown in FIG. 3, provide a diagrammatic view of the propulsion and steer controls for the cross drive transmission.

DESCRIPTION OF PREFERRED EMBODIMENTS

GEARING

Figure 3A:
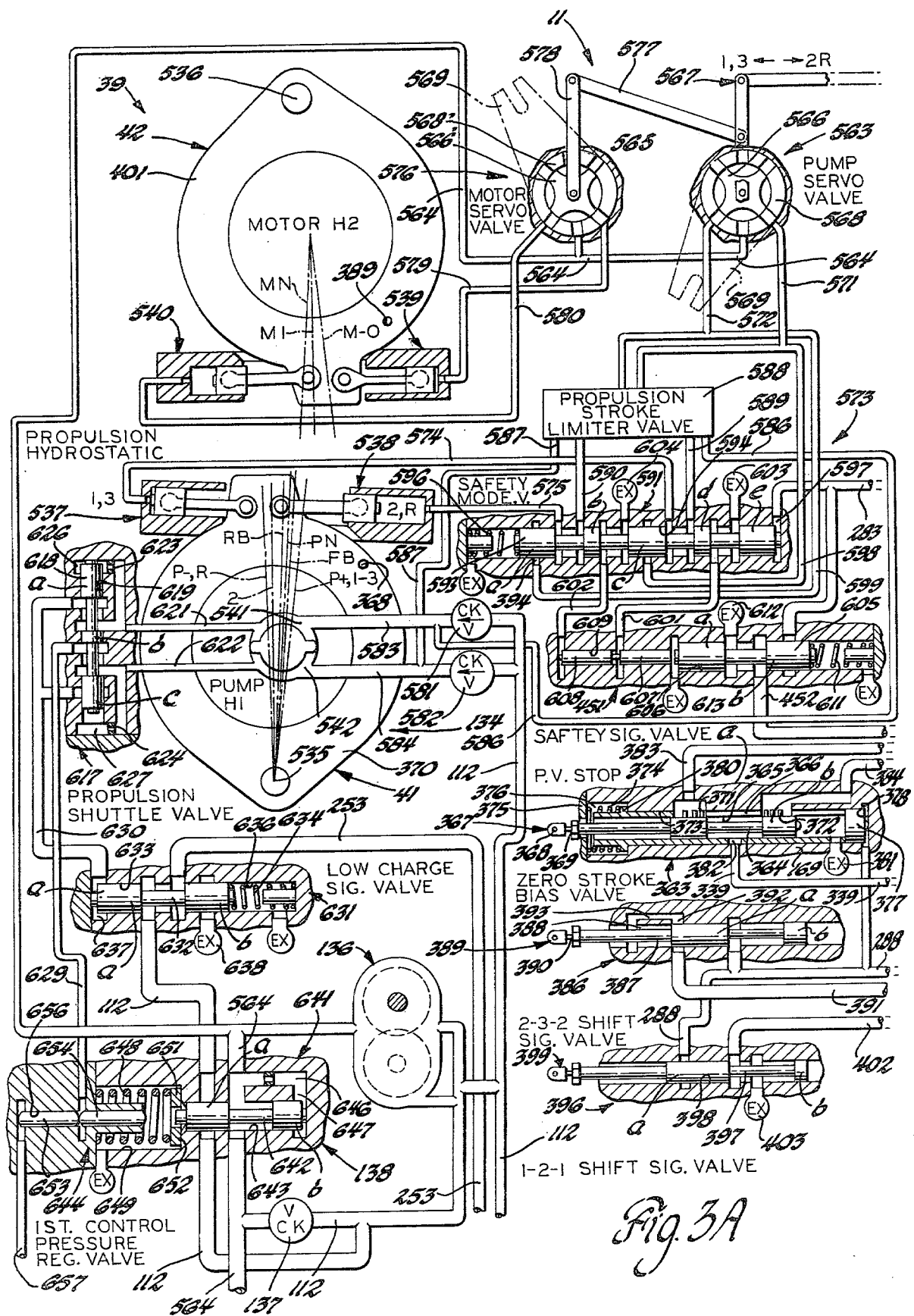

The transmission has a cross drive train 10 (FIGS. 1 and 2) and a control system 11 (FIGS. 3A to 3F). Cross drive train 10 has an input drive 12 which is connected by both a propulsion drive 13 and a steer drive 14 to drive the right and left output drives 16 and 17. In input drive 12, the engine-driven input shaft 18 is drive-connected by a spur gear type 1st input gearset 19 and bevel gearset 20 to drive the cross input shaft 21. The 1st input gearset 19, in the preferred arrangement, provides a speed increase, so cross drive train 10 can be used with different engines. Bevel gearset 20 provides drive from the axially located input shaft 18 to the transverse or cross input shaft 21.

The preferred control system 11 controls the propulsion drive 13 to provide forward and reverse drive. Also, in input drive 12, cross input shaft 21 is drive-connected by a second input drive 22 having a disconnect clutch 24 connected to drive a 2nd input gearset 25 for driving final input shaft 26 which provides one of the two inputs for propulsion drive 13 and the input for steer drive 14, as explained below. The 2nd input gearset 25 has an input gear 27 rotatably mounted on cross input shaft 21 and driven by disconnect clutch 24, and an output gear 28 driving final input shaft 26.

Right output drive 16 has a planetary output gearset 29 having an input ring gear 30 mounted on an input drum 31 which is driven by propulsion drive 13, and an input sun gear 32 which is driven by steer drive 14. Input ring gear 30 and sun gear 32 mesh with planetary pinions 33 rotatably mounted on carrier 34 having a drum portion 35 and being connected to right output shaft 36. The right output brake 37, preferably a fluid-operated and cooled multiplate brake, is located between carrier drum portion 35 and housing 38. The planetary output gearset 29 has a propulsion drive to input ring gear 30 and a steer drive to input sun gear 32 and provides a differential drive to right output shaft 36.

The left output drive 17 is a mirror image of right output drive 16 and functions in the same way, so like reference numerals (primed) have been used (FIG. 1), and reference is made to the above description.

Propulsion drive 13 is a synchronous shifting hydromechanical transmission functioning to provide a wide range of continuously variable torque and speed ratio drives extending through three gear ratios, and is similar to FIG. 3 of the above U.S. Pat. No. 3,982,448. Propulsion drive 13 has a propulsion hydrostatic transmission 39 having a pump or H1 and a motor or H2 hydrostatic units 41 and 42, and 1st, 2nd, and 3rd planetary gearsets 43, 44, and 45, and 1st and 2nd output gearsets 47 and 48 of the spur gear type. The H1 and H2 hydrostatic units are known pump-motor units as shown, for example, in the above U.S. Pat. Nos. 3,274,946 and 3,752,010. The pump and motor hydrostatic units 41 and 42 are also called "H1" and "H2" hydrostatic units because at times H1 acts as a pump and H2 acts as a motor, and at other times H2 acts as a pump and H1 acts as a motor, depending on the direction of power transfer, as pointed out in the description of the operation.

The 1st planetary gearset 43 has planetary pinions 51 rotatably mounted on the carrier 52 and meshing with ring gear 53 and sun gear 54. Final input shaft 26 is drive-connected to ring gear 53, carrier 52 is drive-connected to H1 rotor shaft 56, and sun gear 54 is drive-connected by intermediate shaft 57 to H2 rotor shaft 58. Final input shaft is differentially drive-connected by 1st planetary gearset 43 to both the H1 and H2 rotor shafts 56 and 58.

The 2nd planetary gearset 44 has planetary pinions 61 rotatably mounted on the carrier 62 and meshing with ring gear 63 and sun gear 64. To establish 1st ratio range drive, the fluid-operated friction-type 1st brake 65 is engaged to hold carrier 62 to establish a speed reduction drive from intermediate shaft 57 which is drive-connected to sun gear 64 and provides a reduction gear drive from ring gear 63 to ring gear shaft 66.

The 3rd planetary gearset 45 has planetary pinions 67 rotatably mounted on a carrier 68 and meshing with ring gear 69 which is drive-connected to ring gear shaft 66, and sun gear 71 which is drive-connected to intermediate shaft 57. To establish 3rd ratio range drive, the fluid-operated friction-type 3rd clutch 72 is engaged to provide a 3rd ratio drive 73 from cross input shaft 21 through 3rd clutch 72 and 3rd input gearset 76 having an input gear 77 on a clutch shaft 74 and an output gear 78 driving carrier 68.

The 1st output gearset 47 has an input gear 81 on ring gear shaft 66, and an output gear 82 on cross drive shaft 83 which is connected to drive the input ring gears 30 and 30', respectively, of right and left output drives 16 and 17 for 1st and 3rd ratio drives. The 2nd output gearset 48 has an input gear 86 fixed on H1 rotor shaft 56 and driving output gear 87 which is connected by 2nd clutch 88 (when engaged) to drive cross drive shaft 83 for 2nd ratio drive. The 2nd clutch 88 is a known fluid-operated multiplate friction clutch.

Steer drive 14 has a steer hydrostatic transmission 89 having pump (P) 90 driven by final input shaft 26, and motor (M) 91 driving 1st steer drive shaft 92. In steer drive transmission 89, the hydrostatic units are designated pump (P) and motor (M) since during steer drive, the power transfer is from final input shaft 26 to pump (P) and from motor (M) to 1st steer drive shaft 92. The steer drive gearset 93 has an input gear 94 on 1st steer drive shaft 92 connected by idler gear 94' for driving output gear 95 and 2nd steer drive shaft 96. The 2nd steer drive shaft 96 is connected to drive cross steer shaft 97 by a steer ratio pack 98—which may be a direct connection providing only one ratio drive, or may be a known 3-speed transmission. When steer ratio pack 98 is a 3-speed transmission, the vehicle operator may manually select 1st speed for pivot steer, 2nd speed for normal steer, and 3rd speed for water steer by track drive of amphibious vehicles. The 3-speed transmission may be a manual or powershift type transmission having countershaft or planetary gearing, or a hydromechanical type transmission combining 3-range gearing with steer hydrostatic transmission 89, such as the above propulsion drive 13.

The cross steer shaft 97 and right steer drive gearset 101 and left steer drive gearset 102 provide a differential steer drive 103 respectively to right and left input sun gears 32 and 32' of right and left output drives 16 and 17. Right steer drive gearset 101 has an input gear 104 driven by cross steer shaft 97 and an output gear 105 driving right input sun gear 32. Left steer drive gearset 102 has an input gear 106 driven by cross steer shaft 97, an idler gear 107, and an output gear 108 driving left input sun gear 32'. Thus, right and left input sun gears 32 and 32' are driven in opposite directions at the same speed relative to cross steer drive shaft 97.

Cross drive train 10 (FIGS. 1 and 2) is arranged in barrels, so sump 111 has a high fluid volume capacity in the lower portion of housing 38. Each barrel has a shaft and drive elements concentric therewith. Input barrel IB has cross input shaft 21 and the drive elements concentric therewith, a bevel gear of bevel gearset 20, gears 27 and 77, 3rd clutch 72, and disconnect clutch 24. Output barrel OB has cross drive shaft 83 and the drive elements concentric therewith, right and left output drives 16 and 17, gears 82 and 87, and 2nd clutch 88. Transmission barrel TB has final input shaft 26 and intermediate shaft 57 and the drive elements concentric therewith, 1st, 2nd, 3rd planetary gearsets 43, 44, and 45; gears 28 and 78, and propulsion and steer hydrostatic transmissions 39 and 89. Differential drive barrel DB has cross steer shaft 97 and the drive elements concentric therewith, gears 95, 104, and 106, and steer ratio pack 98. Input barrel IB and output barrel OB are located in the lower portion of housing 38 which closely surrounds the lower portions of barrels IB and OB. Barrels IB and OB have drive elements displacing a small volume of fluid (as compared to that of transmission barrel TB), so sump 111 has a large fluid volume, up to fluid level L (FIG. 2).

Transmission barrel TB, which has a large fluid volume because it has both the propulsion and steer transmissions, is between and above input barrel IB and output barrel OB and the fluid level L. Differential barrel DB is above output barrel OB. This arrangement is very compact so an essentially square housing 38 closely encloses cross drive train 10. The rotary components are supported by bearings supported on housing 38, and fixed components are fixed to housing 38.

CONTROL SYSTEM

The control system 11 (FIGS. 3A to 3F) has portions similar to the above U.S. Pat. No. 3,611,838, and controls a cross drive transmission having a propulsion and a steer drive 13 and 14, having hydrostatic transmissions 39 and 89.

Figure 3B:
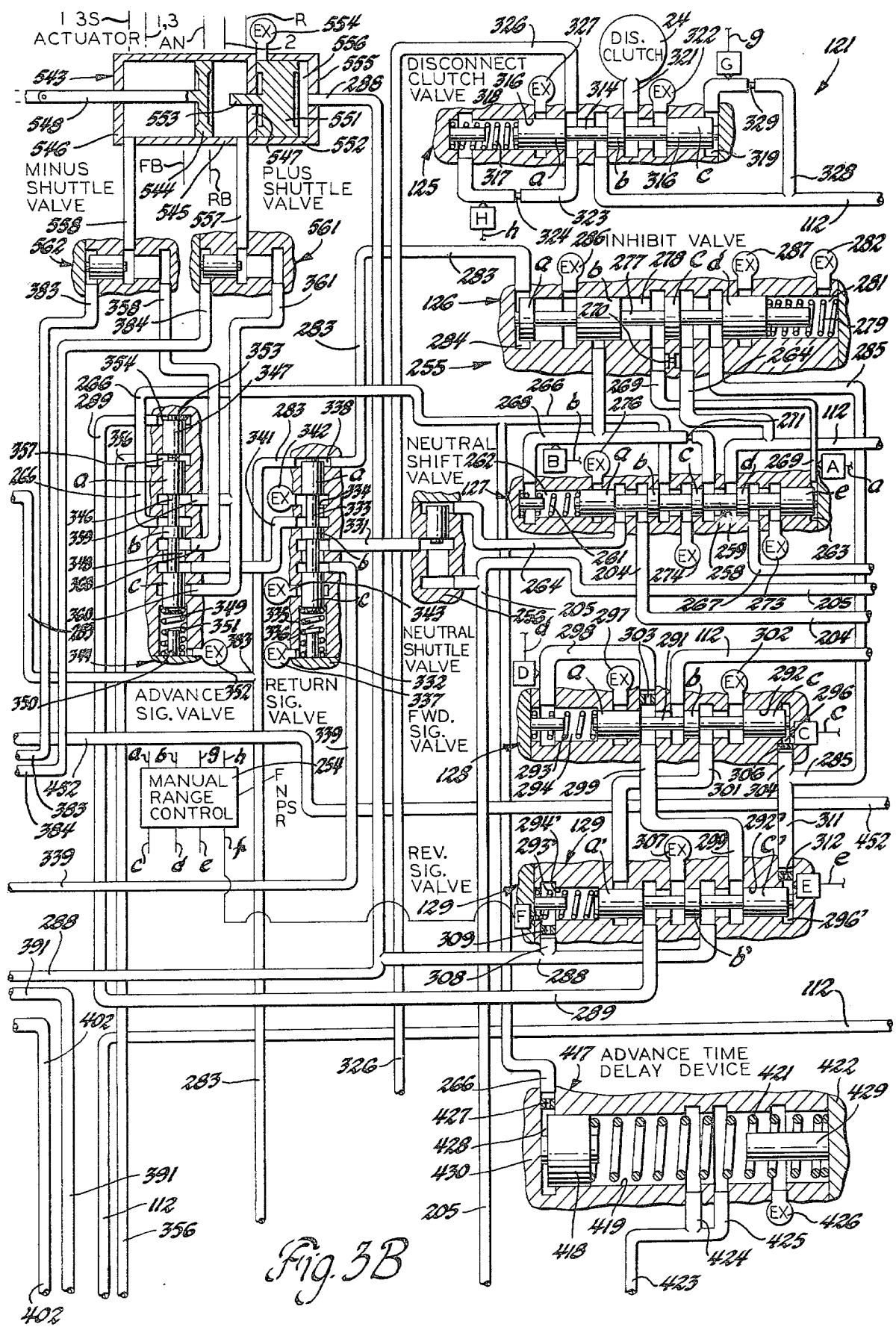
Figure 3C:
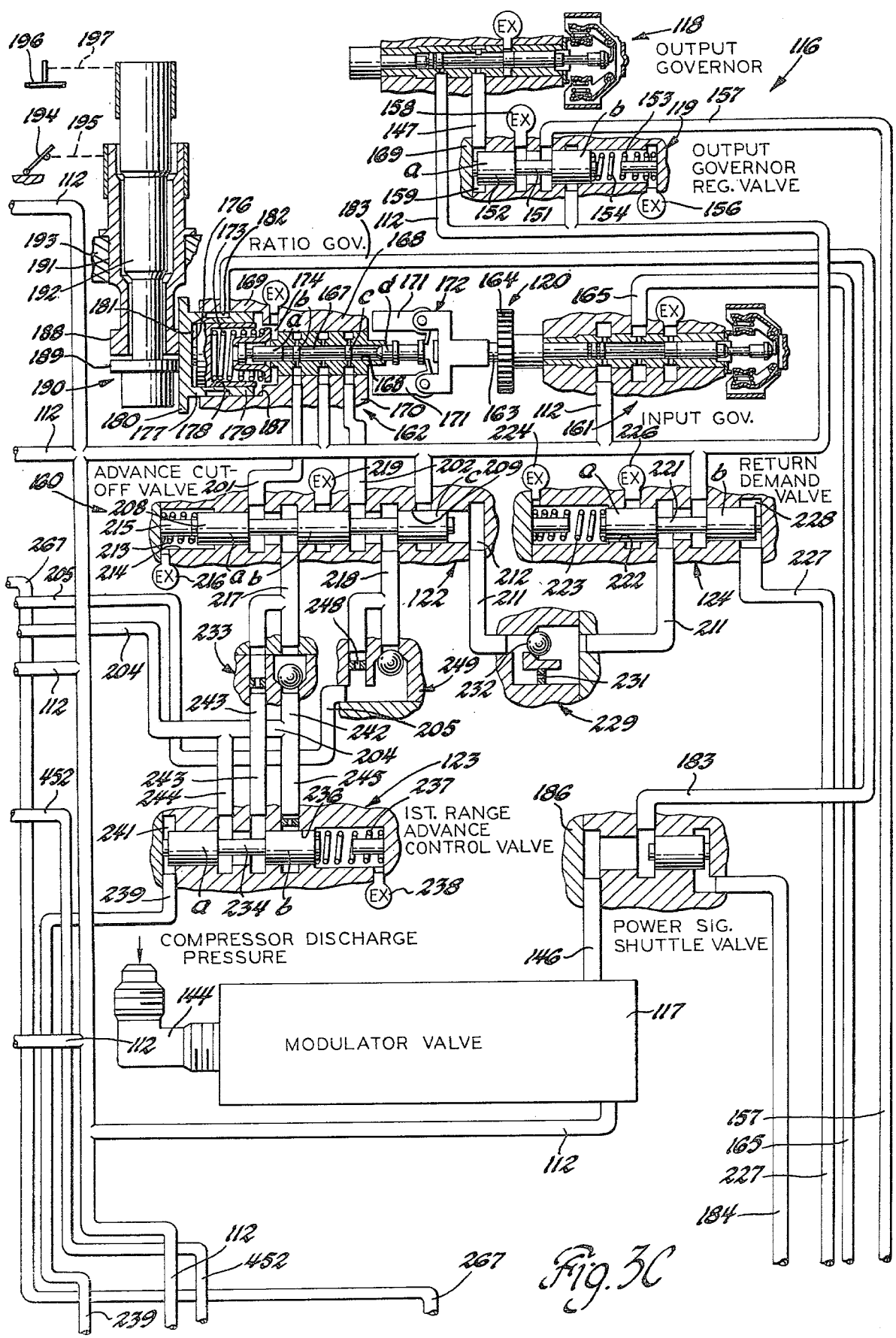
Figure 3D:
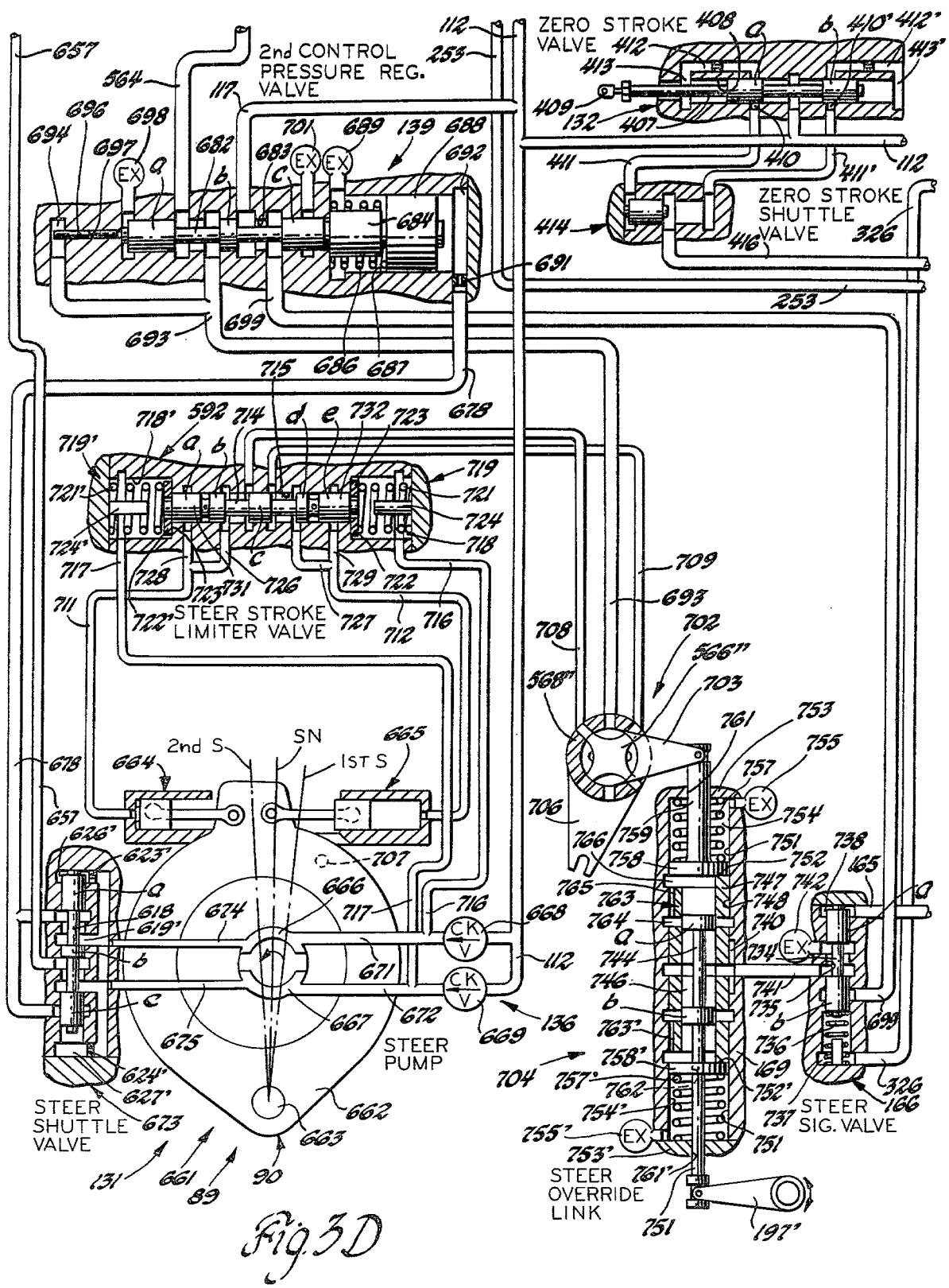
Figure 3F:
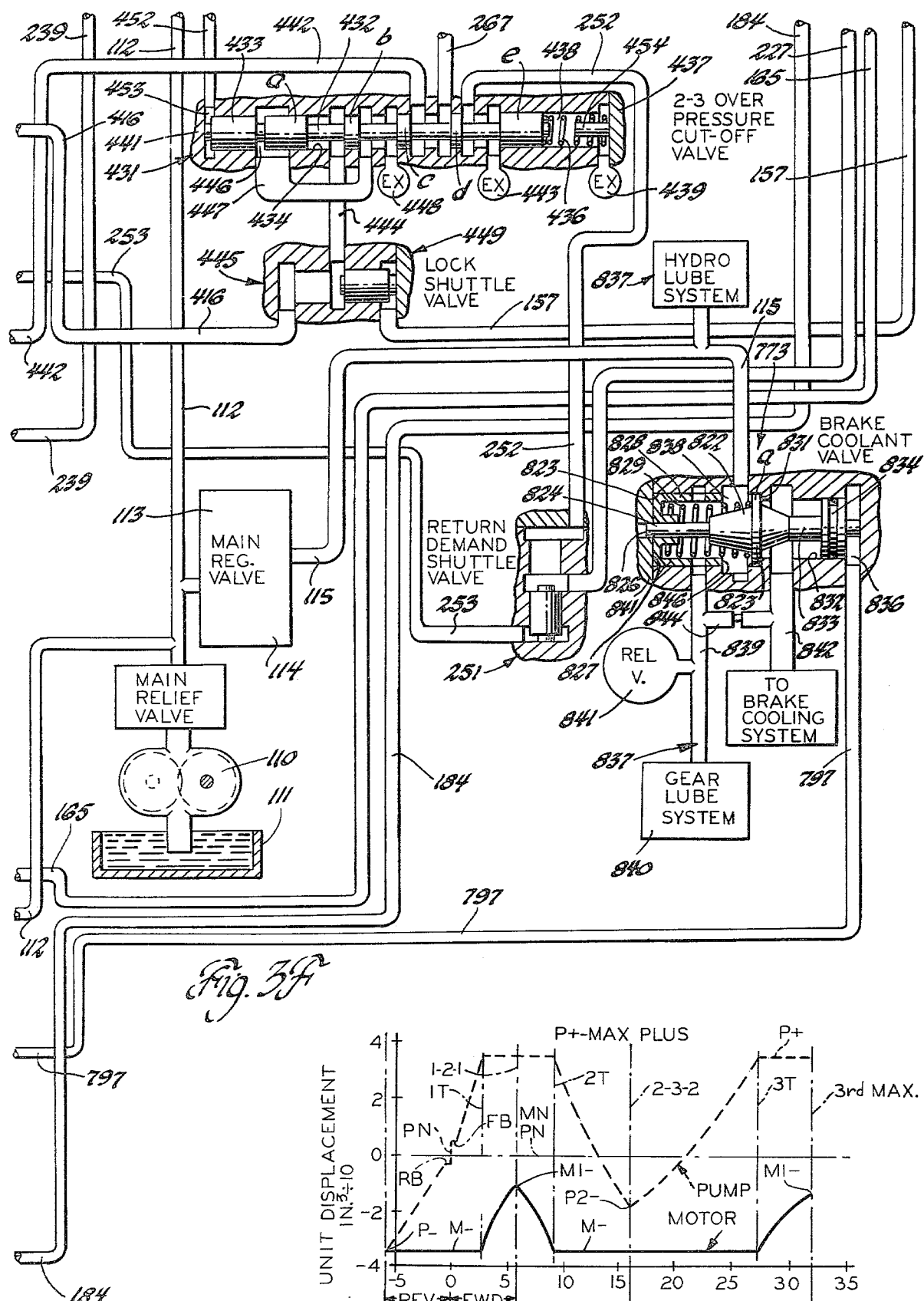

Referring to FIG. 3F, a main pump 110 supplies fluid from sump 111 to mainline 112 extending through a main relief valve 113 which exhausts main pressure fluid back to sump 111 when above regulated mainline pressure.

Mainline 112 supplies control system 11 at mainline regulated fluid pressure regulated by a known main regulator valve 114 which supplies overage fluid to lube line 115. Mainline 112 distributes main pressure fluid to the basic signal controls 116 (FIG. 3C) for control system 11, including modulator valve 117, output speed governor 118, governor signal valve 119, and input speed governor 120. Mainline 112 also supplies, in the propulsion controls 121, advance cut-off valve 122 which is associated with 1st range advance valve 123, return demand valve 124, disconnect clutch valve 125 (FIG. 3B), inhibitor valve 126, neutral shift valve 127, and forward signal valve 128 which controls the supply to reverse signal valve 129. Mainline 112 also supplies hydrostatic drive controls 131 (FIGS. 3A and 3D), zero stroke indicator valve 132, propulsion and steer hydrostatic charging systems 134 and 135, hydrostatic control pump 136, and low charge signal valve 631. Mainline 112 is also the exhaust line for propulsion and steer control pressure regulator valves 138 and 139. Mainline 112 is connected by check valve 137 to propulsion control pressure line 564. Mainline 112 also supplies, in the vehicle service brake system 141 (FIG. 3E), brake apply regulator valve 142.

MODULATOR VALVE

The modulator valve 117, shown in FIG. 3C, is a valve of the type shown in the above U.S. Pat. No. 3,093,010, and is supplied with mainline fluid pressure by mainline 112 and controlled by compressor discharge pressure from a gas turbine engine supplied by compressor discharge pressure line 144, to provide an engine power pressure signal, which increases in proportion to increasing compressor discharge pressure, in engine power signal line 146. Since compressor discharge pressure provides a torque demand signal substantially simultaneous with engine power, this type modulator valve controlled by compressor discharge pressure may be used to provide an engine power pressure signal.

OUTPUT SPEED GOVERNOR

The known output speed governor 118 (FIG. 3C) is driven by a cross drive shaft 83, supplied by mainline 112, and provides output or 2nd governor pressure increasing with output speed in output or 2nd governor pressure line 147. A known two-weight governor providing a stepped governor pressure curve approximating a straight line, with governor pressure increasing with speed, e.g., as shown in the above U.S. Pat. No. 2,762,384, is preferred.

OUTPUT GOVERNOR SIGNAL VALVE

The output governor signal valve 119 has a valve spool 151 having two equal-diameter lands a and b slidable in a valve bore 152. Valve bore 152 and the other valve bores are in a known valve body 169 fixed in housing 38 and having several parts to conveniently locate the valves-except for the bores described as being in movable sleeves.

Spring 153 is located in spring chamber 154, which is an end portion of valve bore 152 vented by exhaust 156, and is seated on the end of bore 152 and engages land 151b to bias valve spool 151 to the exhaust position shown (FIG. 3C), blocking mainline 112 and connecting output or 2nd governor signal pressure line 157 to exhaust 158. Output or 2nd governor pressure line 147 is connected to governor pressure chamber 159, an opposite closed end portion of bore 152, and acts on land 151a to bias valve spool 151 to a pressure-increasing position, blocking exhaust 158 and connecting mainline 112 to 2nd governor signal pressure line 157. Thus, governor signal valve 119 regulates 2nd governor signal pressure to increase from zero pressure at an intermediate output governor pressure value or output speed, and to increase with output speed at the same rate as output governor pressure.

INPUT SPEED GOVERNOR ASSEMBLY

The input speed governor assembly 120 (FIG. 3C) is, in part, similar to governors (114, 116) in the above U.S. Pat. No. 3,611,838. Input speed governor assembly 120 has an engine governor 161 and a ratio governor 162 which are driven by governor shaft 163, and a governor gear 164 driven by the engine or input shaft 18. The known engine governor 161 is like the governors shown in the above U.S. Pat. Nos. 2,762,384 and 3,611,838. This two-weight type engine governor 161 is driven at engine speed, supplied by mainline 112, and provides an input or 1st governor pressure increasing with increasing engine speed in 1st or input governor pressure line 165 which is connected to the steer signal valve 166 (FIG. 3D).

ADVANCE RETURN SIGNAL SYSTEM

The advance return signal system 160 is a governing system and has ratio governor 162 of input speed governor assembly 120; advance cut-off valve 122; 1st range advance control valve 123; return demand valve 124; restriction and check valve device 229; and rate of ratio change control 203 having restriction and check valve devices 233 and 249, for supplying advance or return signals to advance or return line 204 or 205.

RATIO GOVERNOR

The ratio governor 162, as described below, has some portions similar to the ratio governors shown in the above U.S. Pat. No. 3,611,838, and new portions.

The ratio governor 162 includes a ratio governor valve 170 having a valve spool 167 having four equal-diameter, spaced lands a, b, c, and d, slidably disposed in a valve bore 168 in valve body 169. A pair of flyweights 171 of the flyweight assembly 172 are rotated by governor shaft 163 so that an outward force proportional to engine speed is imposed on the right end of valve spool 167. A spring 173 is compressed between a spring seat 174 fixed on the other end of valve spool 167 and the end wall 176 of piston 177 slidable in a bore 178 of control cylinder 179 having an end wall 180. A chamber 181 in control cylinder 179, between end wall 180 and end wall 176 of piston 177, is continuously connected by transfer port 182 to power signal line 183 which supplies a pressure proportional to engine power or brake apply pressure. The higher pressure in engine power signal line 146 or vehicle brake apply signal line 184 is connected by power signal shuttle valve 186 (a known shuttle valve) to power signal line 183. Control cylinder 179 is slidably mounted in a bore 187 in valve body 169. There is sufficient clearance for full control movement of both piston 177 and control cylinder 179. Either or both throttle cam 188 or steer request cam 189 abuts the end wall 180 of control cylinder 179 to variably position control cylinder 179. Throttle and steer request cams 188 and 189 are respectively fixed on throttle and steer request shafts 191 and 192 which are concentrically rotatably mounted on a support portion 193 of transmission housing 38. The engine throttle 194 is connected by throttle linkage 195 to rotate throttle shaft 191 and cam 188 in proportion to throttle position or leading torque demand. The steer request lever 196, which is controlled by the driver to request steer, is connected by steer request linkage 197 to rotate steer request shaft 192 and cam 189 in accordance with steer request.

In this throttle and steer request device 190, the throttle cam 188 or steer request cam 189 moves control cylinder 179 which engages and moves piston 177—or power pressure in chamber 181 moves piston 177—so that spring 173 provides a bias force on valve spool 167 which is equal to the highest of the bias forces provided in response to the control functions, throttle demand, steer request, engine power, or brake apply pressure. This bias force determines the set speed, a predetermined variable speed value in a range from engine idle speed to maximum engine speed, at which ratio governor 162 regulates engine speed by controlling the propulsion drive ratio.

In ratio governor valve 170, the central lands b and c of spool 167 block bore 168 and have a small land overlap relative to the ports for advance and return feed lines 201 and 202, while end lands a and d of spool 167 have a through-passage or groove for exhaust. Mainline 112 is connected to bore 168 between lands b and c of spool 167. When engine speed equals or matches set speed, mainline pressure is connected through the land overlap to both advance and return feed lines 201 and 202; and both lines are connected through the overlap respectively through lands a and d of spool 167 to exhaust, so both the advance and return signal pressures have low values. On engine overspeed (engine speed greater than the set speed), mainline pressure is supplied to advance feed line 201 to increase advance signal pressure to mainline pressure, and return feed line 202 is exhausted through land d of spool 167. On engine underspeed (engine speed less than the set speed), mainline pressure is supplied to return feed line 202 to increase return signal pressure to mainline pressure, and advance feed line 201 is exhausted through land a of spool 167. An increased degree of movement of valve spool 167 from a central position in the range of the land overlap increases the rate of pressure change of the advance and return signals.

On movement from its minimum (idle) to full (maximum) throttle position, engine throttle 194 rotates throttle cam 188 to act on and move control cylinder 179 and piston 177, and spring seat 174 to increase the bias force of spring 173 and to increase the set speed of ratio governor 162 from minimum (idle) to maximum set speed—such as full power engine speed or maximum engine speed.

On movement from its minimum to maximum positions, the null or straight steer position, to either right or left full or maximum steer request positions, the steer request lever 196 rotates steer request cam 189 in either direction. Similar right and left portions of steer request cam 189 act similarly to increase the bias force of spring 173 to increase the set speed from a minimum (idle) to a high set speed, e.g., 80% of maximum engine speed.

As set forth above and further explained below, each control functions at its minimum value—idle throttle demand, zero steer request, idle engine power or compressor discharge pressure, and brake disengaged or zero brake apply pressure operates to control ratio governor 162 to provide the minimum, or engine idle set speed. Then, as the control functions are increased, the set speed is increased from idle speed to higher engine speeds. The set speed will be the highest set speed called for by any one of these control functions which individually operate independently or, in the absence of any other control function, as follows.

The power pressure signal in power signal line 183 is alternatively the engine power signal pressure or vehicle brake apply pressure, and acts in control cylinder chamber 181. Since control cylinder 179 abuts at least one of the throttle and steer request cams 188 and 189, there is a reaction; and when the power pressure has a sufficiently high value to provide a higher bias force on spring 173 than that provided by throttle and steer request cams 188 and 189, the power pressure moves piston 177 to increase the bias force of spring 173 and the set speed from a minimum to a maximum set speed. The minimum set speed for each of these control functions, torque demand, steer request, engine power and brake torque at their minimum value, is engine idle speed. Control cylinder 179 will be positioned by the one of throttle and steer request cams 188, 189, calling for the higher set speed, and power pressure in chamber 181 will not move piston 177 away from abutting relation with control cylinder 179 to increase the bias force of spring 173, unless the power pressure calls for a higher set speed. Thus, the set speed will be the highest set speed called for by one of these control functions—but not higher because these control functions forces on spring 173 are not added.

The throttle control, on movement from its minimum to maximum position, will increase the set speed from idle speed to a high or maximum set speed, e.g., full power or maximum engine speed. Then, after a time delay as engine power increases to a maximum, the engine power signal supplied by compressor discharge pressure will increase the set speed to the maximum engine speed. This arrangement provides ratio change in response to torque demand shortly before the resultant change of engine torque and power during engine acceleration, and ratio change in response to actual engine torque and power during deceleration.

The steer request cam 189, as steer request varies in the full range (zero to maximum), controls the set speed in a wide speed range (e.g., idle to 80% of maximum speed), to maintain engine speed at higher values relative to propulsion output speed to maximize steer operation—even though the operator decreases throttle demand. At higher engine speeds, steer drive 14, with the same steer ratio will provide a greater speed difference between the right and left output drives 16 and 17, and thus the output shafts 36 and 36' have a larger differential speed for tighter or smaller radius turns. When steering, the vehicle operator often reduces the throttle to reduce propulsion power, but this steer request control prevents a fully proportional reduction of steer capability and maintains a higher proportion of maximum steer capability.

Normally when the vehicle service brake system 141 is applied for vehicle braking, the throttle 194 is returned to Idle and the power pressure signal, based on compressor discharge pressure, will then return to Idle. Thus, during braking—as the engine power pressure signal decreases and vehicle brake apply pressure increases—the power signal shuttle valve 186 connects the higher of these pressures via power signal line 183 to chamber 181 of ratio governor 162 to maintain the set speed and thus engine speed at higher values, thus maintaining higher engine braking and higher steer capability during vehicle braking.

RETURN DEMAND CONTROL

Return demand control 206 employs an advance cut-off valve 122 controlled by return demand valve 124 which is controlled by a return demand signal supplied by return demand signal line 227 which, in turn, is supplied by 2-3 overpressure cut-off valve 431 or low charge signal valve 631, as explained below.

ADVANCE CUT-OFF VALVE

The advance cut-off valve 122 has a spool 208 having three equal-diameter lands a, b, and c, slidable in a bore 209. Operating pressure, which normally is supplied by operating line 211 to closed operating chamber 212 at one end of bore 209, moves spool 208 against spring 213 to engage stop 215 in the connecting position shown in FIG. 3C. Spring 213 is located in spring chamber 214 which is located at the opposite end of bore 209 and is vented by an exhaust 216. In this normal connecting position of advance cut-off valve 122, advance and return feed lines 201 and 202 are respectively connected, between lands a and b and lands b and c of spool 208, to advance and return connecting lines 217 and 218. When operating line 211 is exhausted, spring 213 moves spool 208 to the cut-off position so advance cut-off valve 122 functions so that lands a and b of spool 208 respectively block advance and return feed lines 201 and 202, advance connecting lines 217 is connected between lands a and b of spool 208 to exhaust 219, and mainline 112 is connected between lands b and c of spool 208 to return connecting line 218.

RETURN DEMAND VALVE

Return demand valve 124 has a spool 221 having two equal-diameter lands a and b slidable in a bore 222. Spool 221 is biased by spring 223 to the normal connecting position shown (FIG. 3C), blocking exhaust 226 and connecting mainline 112 to operating line 211. Spring 223 is located in one end of bore 222 which is vented by exhaust 224. The return demand signal line 227 is connected to chamber 228 to move spool 221 against spring 223 to the cut-off position, blocking mainline 112 and connecting operating line 211 to exhaust 226 permitting advance cut-off valve 122 to be moved by its spring 213 to the advance cut-off position. A timing or restriction and check valve device 229 having restriction 231 and check valve 232 is placed in operating line 211 for delayed flow only through the restriction 231 to operating chamber 212 to delay movement of advance cut-off valve 122 to the normal connecting position and rapid exhaust flow from operating chamber 212 through both the restriction 231 and check valve 232 for rapid movement of advance cut-off valve 122 to the cut-off position for rapid cut-off of advance pressure and supply of return pressure and delayed return to normal position for connection of advance and return pressures as supplied by ratio governor 162.

RATE OF RATIO CHANGE CONTROLS

To provide, in the advance return signal system 160, governor stability and smooth ratio change, rate of ratio change controls 203, between the advance and return feed lines 201 and 202 and advance and return lines 204 and 205, provide a high rate of flow and pressure increase of return pressure to return line 205 for rapid response to a request for reduction of drive ratio and a lower rate of flow and pressure increase of advance pressure to advance line 204 for slower response to a request for an increase of drive ratio.

The advance connecting line 217 is connected by a restriction and check valve device 233 and 1st range advance control valve 123 to advance line 204. The 1st range advance control valve 123 has a spool 234 having equal-diameter lands a and b slidable in a bore 236. Spring 237, in one end of bore 236 vented by exhaust 238, biases spool 234 to the higher range position shown in FIG. 3C. The 1st apply pressure, which is supplied by 1st apply line 239 to operating chamber 241 located at the opposite end of bore 236, moves spool 234 against spring 237 to the low or 1st range position. When advance pressure is supplied from advance connecting line 217 to restriction and check valve device 233, the check valved line 242 is closed and blocks flow, and flow is only via restricted line 243 to 1st range advance control valve 123 which, in higher 2nd and 3rd range positions, connects restricted line 243 via its free-flow advance branchline 244 to advance line 204, and in 1st range position connects restricted line 243 via its restricted branchline 245 to advance line 204. Thus, in 1st range the supply of advance pressure flow is restricted by two restrictions in series—restricted line 243 and restricted branchline 245. So the delay in advance pressure flow and pressure increase in 1st ratio range is greater than in higher ranges wherein advance flow is only through one restriction, restricted line 243. When advance pressure decreases, the flow is from advance line 204 to the now open check valved line 242 which by-passes 1st range advance control valve 123 for flow to advance connecting line 217 to exhaust at advance cut-off valve 122 or ratio governor 162.

The return connecting line 218 is connected through both check valve 247 and restriction 248 of check valve and restriction device 249 for fast flow to and rapid increase of return pressure in return pressure line 205. When return pressure decreases, the reverse direction flow is only through restriction 248 and via advance cut-off valve 122 for exhaust at ratio governor 162 for slow decrease of return pressure.

In the rate of ratio change controls 203, normally there is no return demand signal pressure in return demand signal line 227, so the return demand valve 124 supplies operating pressure via operating line 211 to position advance cut-off valve 122 in the connecting position shown (FIG. 3C) for connecting advance and return feed lines 201 and 202 respectively to advance and return connecting lines 217 and 218. Return feed line 202 and connecting line 218 are connected via both open check valve 247 and restriction 248 for rapid supply to return line 205, and advance line 204 is connected by both open check valved line 242 and restricted line 243 for rapid exhaust to advance connecting line 217 and feed line 201 for rapid response to a request for a reduction in the ratio of the propulsion drive. Conversely, advance pressure is supplied with delay from advance connecting line 217 only through one restriction—restricted line 243, to advance line 204 for delay in the higher ratio drives (2nd and 3rd), and through two restrictions—restricted line 243 and restricted advance branchline 245, for greater delay in low ratio drive (1st); and return line 205 is exhausted only via restriction 248 for delay of exhaust of return line 205, so the propulsion hydrostatic transmission 39 and propulsion drive 13 have a delayed response to a request for increase in drive ratio.

In 1st range which uses 1st gear ratio, the vehicle is accelerated from zero speed, so ratio changes represent large percentage changes in speed. The drive system is therefore more sensitive to rate of ratio change in 1st range than it is in higher transmission gear ratios. To further desensitize ratio change in propulsion drive 13 in 1st range, 1st range clutch pressure operates on 1st range advance control valve 123 (as explained above) and provides a 2nd restriction, restricted advance branchline 245 in series with a 1st restriction, restricted line 243, in the advance pressure feed to advance line 204. Therefore, rate of ratio change controls 203 provide a variable advance signal pressure rate of change based on the transmission operating ratio range.

The return demand signal in return demand signal line 227 operates return demand valve 124 to exhaust operating line 211 quickly through full-flow check valve 232 to quickly move advance cut-off valve 122 for rapid supply of return pressure from mainline 112 to return line 205 and rapid exhaust of advance pressure from advance line 204. The restriction and check valve devices 233 and 249, as pointed out above, provide rapid supply of return pressure and exhaust of advance pressure. Mainline 112 is used to supply return pressure, so this supply of return pressure is continuous and not dependent on the operation of ratio governor 162. The return demand signal line 227 is supplied by return demand shuttle valve 251 (FIG. 3F) when a fluid pressure signal is supplied by either or both overpressure signal line or low charging pressure signal line 253, respectively, indicating excessive high control or kidney pressure and less than normal charging or low kidney pressure in propulsion hydrostatic transmission 39, as explained below.

PROPULSION RATIO CONTROLS

The advance line 204 is connected to neutral shift valve 127 (FIG. 3B). The return line 205 is connected to neutral shuttle valve 256 (FIG. 3B), and to ratio shift signal valve 257 (FIG. 3E). These and the other components of propulsion ratio control 121 are now described.

MANUAL RANGE CONTROL

A known manual control 254 (FIG. 3B), having an electric supply, manually controlled switches, and an electric circuit having a connection a to h to each grounded solenoid valve A to H, as shown e.g., in the above U.S. Pat. No. 3,640,157, energizes the solenoid valves A to H in each manual range position, as indicated by "X" in the following TABLE I.

TABLE I

| MANUAL RANGE | | SOLENOID VALVES | | | | | | | |
|---|---|---|---|---|---|---|---|---|---|
| | | A | B | C | D | E | F | G | H |
| FORWARD | (F) | | X | X | | X | | | X |
| NEUTRAL | (N) | X | | X | | | X | X | |
| PIVOT STEER | (PS) | X | | X | | | X | | X |
| REVERSE | (R) | | X | | X | | X | | X |

Each known solenoid valve (A to H) is connected to an associated valve operating pressure chamber, as explained below. There is a restricted feed to each operating chamber. The associated solenoid valve, when de-energized, is normally closed to provide pressure in the associated chamber, and when energized, opens to exhaust the associated chamber.

The manual range control 254 controls hydraulic range controls 255 which includes neutral shift valve 127, inhibitor valve 126, disconnect clutch valve 125, and forward and reverse signal valves 128 and 129.

NEUTRAL SHIFT VALVE

The neutral shift valve 127 (FIG. 3B) has a spool 258 having five equal-diameter lands a, b, c, d, and e, slidably disposed in bore 259. A compression spring 261, in 1st chamber 262 at one end of bore 259, engages land a of spool 258 and urges spool 258 to the right so that land e of spool 258 abuts the other end of bore 259 which encloses 2nd chamber 263. 1st and 2nd chambers 262 and 263 are closed. The 1st chamber 262 adjacent land a of spool 258 is connected to the solenoid valve B, and the 2nd chamber 263 adjacent the right end of land e of spool 258 is connected to solenoid valve A. Bore 259 is connected to mainline 112, a neutral advance line 264, automatic advance line 266, advance line 204, range feed line 267, 1st and 2nd chamber feed lines 268 and 269, and exhausts 273, 274, and 276. The 1st chamber feed line 268 is connected through restriction 271 therein to solenoid valve B for pressure control and to supply mainline fluid pressure to, or exhaust from, 1st chamber 262 and indicator valve 126, respectively, when neutral shift valve 127 is in the neutral position or drive position. Solenoid valve B retains or exhausts this pressure downstream of restriction 271 in 1st chamber 262 and supplied to inhibitor valve 126 respectively when solenoid valve B is deenergized or energized. Mainline 112 is always connected through restriction 270 to 2nd chamber feed line 269 which is connected to solenoid valve A for pressure control, and to supply pressure to, or exhaust from, 2nd chamber 263 and inhibitor valve 126, respectively, when solenoid valve A is deenergized or energized.

In Neutral and Pivot Steer Manual Ranges, the solenoid valve A is energized, so 2nd chamber 263 adjacent land e of spool 258 will be exhausted, and spring 261 and pressure in 1st chamber 262—because solenoid valve B is deenergized—positions neutral shift valve 127 in the neutral position shown (FIG. 3B). In forward and reverse automatic drive manual ranges, solenoid valve B is energized to exhaust 1st chamber 262 adjacent land a of spool 258 and solenoid valve A is deenergized so pressure in 2nd chamber 263 acts on land e of spool 258 to cause the spool 258 to shift against spring 261 to drive position. Solenoid valve B and 1st chamber 262 are used so that if solenoid valve A is not energized in Neutral or Pivot Steer manual ranges, neutral shift valve 127, in neutral position nevertheless will remain in neutral position.

Neutral shift valve 127, in neutral position, connects mainline 112 to 1st chamber feed line 268 and through restriction 271 therein for control by solenoid valve B and to 1st chamber 262 and inhibitor valve 126, advance line 204 to neutral advance line 264 for neutral operation of propulsion hydrostatic transmission 39, range feed line 267 to exhaust 273 so no range ratio is established, and automatic advance line 266 to exhaust 274 so there is no automatic advance of ratio of propulsion hydrostatic transmission 39. Neutral shift valve 127, in drive position, connects advance line 204 to automatic advance line 266 for automatic advance of propulsion hydrostatic transmission 39, and connects neutral advance line 264 to exhaust 276. Also, in drive position of neutral shift valve 127, mainline 112 is connected to range feed line 267 for range ratio shifting, 1st chamber feed line 268 is disconnected from mainline 112 and connected to exhaust 274, so 1st chamber 262 is exhausted. Solenoid valve B is also energized for exhaust for this automatic forward-reverse drive position.

INHIBITOR VALVE

The inhibitor valve 126 (FIG. 3B), for inhibiting ratio change, has a spool 277 having four equal-diameter lands a, b, c, and d, slidable in bore 278. Spool 277 is biased to the normal or 1st ratio range position shown by spring 279 in spring chamber 281 at one end portion of bore 278 vented by exhaust 282 when 2-3 feed line 283 is exhausted in 1st ratio range. Spool 277 is moved to 2-3 ratio range position in 2nd and 3rd ratio ranges when 2-3 feed line 283 supplies 2-3 feed pressure to 3rd chamber 284 at the opposite end of bore 278 to move spool 277 against spring 279. Mainline 112, 1st (B) and and 2nd (A) chamber feed lines 268 and 269, 3rd (C and E) chamber feed line 285, and exhausts 286 and 287 are connected to bore 278 for control by spool 277. The letters within parentheses indicate the solenoid valves supplied by these chamber feed lines. When inhibitor valves 126 and its spool 277 are in 1st ratio range position shown (FIG. 3B), mainline 112 is connected only by restriction 270 to 2nd chamber feed line 269 and is connected between lands c and d of spool 277 to 3rd chamber feed line 285, and 1st chamber feed line 268 is blocked from exhaust 286 to be operative and exhaust 287 is blocked. When inhibitor valve 126 and its spool 277 are in the 2-3 ratio range position, mainline 112 is connected between lands b and c of spool 277 for full-flow to 2nd chamber feed line 269 in addition to the connection by restriction 270, and 1st and 3rd chamber feed lines 268 and 285 are respectively connected to exhausts 286 and 287 to exhaust 1st chamber 262 of neutral shift valve 127 and reverse chambers 296 and 296' of forward and reverse signal valves 128 and 129.

FORWARD AND REVERSE SIGNAL VALVES

The forward and reverse signal valves 128 and 129 (FIG. 3B) are supplied by mainline 112 and controlled by selectively energized solenoid valves C, D, E, and F, to selectively supply forward or reverse signal lines 288 or 289 when the manual range control 254 is, respectively, in forward or reverse range position. Both forward and reverse signal lines 288 and 289 are exhausted in neutral and pivot steer positions of the manual range control 254.

The forward signal valve 128 has a spool 291 having three equal-diameter lands a, b, and c, slidable in a bore 292. Spring 293, located in forward pressure chamber 294 and forward shift pressure in forward pressure chamber 294 both act on land a of spool 291 to bias spool 291 to the forward position shown, even if there is reverse shift pressure in reverse pressure chamber 296. Reverse shift pressure in reverse pressure chamber 296 at the opposite end of spool 291 acts on land c of spool 291 in the opposite direction to bias spool 291 to reverse position against spring 293 when forward pressure chamber 294 is exhausted.

Reverse signal valve 129 (FIG. 3B) has the same structure as forward signal valve 128 so the same reference numerals (primed) have been used for the structure with reference to the above description of the forward signal valve 128, and the different connections and solenoid valves are now described.

In the forward signal valve 128, bore 292 is connected to forward exhaust 297, forward chamber feed line 298 and forward feed line 299, mainline 112, reverse feed line 301 and reverse exhaust 302. Forward chamber feed line 298 has a restriction 303 and is connected to feed forward pressure chamber 294 and the pressure therein is controlled by solenoid valve D. The 3rd chamber feed line 285 is connected by reverse chamber feed line 304 which has restriction 306 to feed reverse pressure chamber 296, and the pressure therein is controlled by solenoid valve C.

In the reverse signal valve 129, bore 292' is connected to reverse feed line 301, reverse signal line 289, exhaust 307, forward signal line 288 and forward feed line 299. Forward chamber feed line 308 having restriction 309 connects forward signal line 288 to feed forward chamber 294', and the pressure therein is controlled by solenoid valve F. The 3rd chamber feed line 285 is also connected by reverse chamber feed line 311 having restriction 312 to feed reverse pressure chamber 296', and the pressure therein is controlled by solenoid valve E.

When gear ratio control 420 is providing neutral or 1st ratio range for forward or reverse drive, the 2-3 feed line 283 is exhausted, so inhibitor valve 126 supplies 3rd chamber feed line 285, and forward and reverse signal valves 128 and 129 are moved to all manual range positions in response to manual range control 254, as described below.

When the manual range control 254 is in forward position, in forward and reverse signal valves 128 and 129, respectively, solenoid valves C and F are energized to exhaust reverse pressure chambers 296 and 296', so springs 293 and 293' move both forward and reverse signal valves 128 and 129 to the forward position shown (FIG. 3B). When forward signal valve 128 is in forward position, forward exhaust 297 is blocked, mainline 112 is connected to feed forward chamber feed line 298 and forward feed line 299 and exhaust reverse feed line 301 to reverse exhaust 302. When reverse signal valve 129 is in forward position, forward feed line 299 is connected to supply forward signal pressure to forward signal line 288, reverse signal line 289 is connected to exhaust 307, and reverse feed line 301 is blocked. Since mainline pressure is supplied to both forward chamber feed lines 298 and 308 which respectively feed forward pressure chambers 294 and 294', solenoid valves D and F are deenergized and thus closed, so both forward pressure chambers 294 and 294' are pressurized to hold both forward and reverse signal valves 128 and 129 are in forward position supplying forward signal line 288.

When manual range control 254 is in neutral range position, solenoid valves C and D are respectively energized and denergized as in forward range position, so forward signal valve 128 remains in the forward position and functions as described above for forward position. In this neutral range position of manual range control 254, the energization of solenoid valves E and F is reversed—E being deenergized and F energized—so reverse pressure chamber 296' is pressurized and forward pressure chamber 294' is exhausted, so reverse signal valve 129 is moved to reverse position. Thus forward signal valve 128 in forward position provides the above-described connections. Reverse signal valve 129 in reverse position blocks forward feed line 299 at land c of spool 291', connects forward signal line 288 to exhaust 307 and connects reverse signal line 289 to reverse feed line 301 for connection by forward signal valve 128 to reverse exhaust 302, so both the forward and reverse signal lines 288 and 289 are exhausted in neutral manual range.

In pivot steer manual range position of manual range control 254, the same solenoid valves are energized to provide the same operation exhausting both forward and reverse signal lines 288 and 289 as in neutral manual range position described above.

When manual range control 254 is in reverse position, solenoid valves C and E are deenergized to pressurize reverse chambers 296 and 296', and solenoid valves D and F are energized to exhaust forward chambers 294 and 294' so both forward and reverse signal valves 128 and 129 are in reverse position. In forward signal valve 128, mainline 112 is connected to reverse feed line 301 and both forward feed line 299 and forward chamber feed line 298 are connected to forward exhaust 297. In reverse signal valve 129, forward signal line 288 and forward chamber feed line 308 are connected to exhaust 307 and reverse feed line 301 is connected to supply mainline pressure to reverse signal line 289.

In 2nd and 3rd ratio ranges, inhibitor valve 126 exhausts 3rd chamber feed line 285 so the reverse pressure chambers 296 and 296' cannot be pressurized—even though solenoid valves C and E are deenergized—so both forward and reverse signal valves 128 and 129 cannot be shifted to reverse position. Thus during operation in forward manual range, 2nd or 3rd ratio range, a shift to neutral, pivot steer, or reverse manual ranges will be inhibited until ratio range is reduced to 1st ratio range, where shifts between all manual ranges are permitted.

In neutral and pivot steer manual range positions, forward signal valve 128 is in forward position and reverse signal valve 129 is in reverse position. On a shift to forward manual range position, only reverse signal valve 129 is shifted to forward position by spring 293' when reverse pressure chamber 296' is exhausted by solenoid valve E, and then forward signal pressure from forward signal line 288 via forward chamber feed line 308 pressurizes forward chamber 294' as solenoid valve F is deenergized and closed. On a shift to reverse manual range, only forward signal valve 128 is shifted to reverse position by energizing solenoid valve D to exhaust forward chamber 294 and deenergizing solenoid valve C to pressurize reverse pressure chamber 296. On a direct shift from forward to reverse manual range positions, quickly through neutral, both solenoid valves D and F are energized to exhaust forward pressure chambers 294 and 294' and both solenoid valves C and E are deenergized to pressurize reverse pressure chambers 296 and 296' to shift both forward and reverse signal valves 128 and 129 to reverse position to supply reverse signal line 289. On a reverse to forward manual range shift, both soleniod valves C and E are energized to exhaust reverse pressure chambers 296 and 296' so springs 293 and 293' shift both forward and reverse signal valves 128 and 129 to forward position to supply forward signal pressure to forward signal line 288 and pressurize forward pressure chambers 294 and 294' as solenoid valves D and F are deenergized.

DISCONNECT VALVE

Disconnect clutch valve 125 (FIG. 3B) has a spool 314 having three equal-diameter lands a, b, and c, slidable in a bore 316. At one end of disconnect valve 125, spring 317 in disconnect chamber 318 and pressure in disconnect chamber 318 may both act on the end of land a of spool 314 to bias spool 314 to disconnect position shown. At the other end of disconnect valve 125, pressure in connect chamber 319 may act on the end of land c of spool 314 in the opposite direction to the connect position. Disconnect valve 125, with spool 314 in the disconnect position shown, connects disconnect clutch 24 via disconnect clutch apply line 321 to release disconnect clutch 24, connects mainline 112 to disconnect chamber feed line 323 which has restriction 324, and connects mainline 112 to steer signal line 326. In connect position of spool 314, disconnect valve 125 connects mainline 112 to disconnect clutch apply line 321 to apply disconnect clutch 24 and connects disconnect chamber feed line 323 and steer signal line 326 to exhaust 327. Mainline 112 is connected by connect chamber feed line 328 which has restriction 329, and downstream thereof is controlled by solenoid valve G to control pressure in connect chamber 319. Disconnect chamber feed line 323, downstream of its restriction 324, is controlled by solenoid valve H and supplies disconnect chamber 318.

When the manual range control 254 is in neutral position, solenoid valve G is energized to exhaust connect chamber 319 so spring 317 moves spool 314 to the disconnect position shown (FIG. 3B), and then mainline 112 feed disconnect chamber feed line 323 to pressurize disconnect chamber 318, as solenoid valve H is deenergized, and feed steer signal line 326. In the other manual range positions (forward, pivot steer, and reverse), solenoid valve G is deenergized to pressurize connect chamber 319 and solenoid valve H is energized to exhaust disconnect chamber 318; so disconnect valve 125, with its spool 314 in connect position, connects mainline 112 to clutch apply line 321 to apply disconnect clutch 24, and connects steer signal line 326 and disconnect chamber 318 and its feed line 323 to exhaust 327. As pointed out below, steer signal line 326 prevents steering in neutral.

ADVANCE RETURN SIGNAL SYSTEM

Neutral Shuttle Valve

The return line 205 is supplied by advance return signal system 160 (FIG. 3C).

The neutral advance line 264 is supplied by neutral shift valve 127 in neutral position, in neutral and pivot steer manual ranges, from advance line 204 supplied by advance return signal system 160. Return line 205 and neutral advance line 264, which alternatively have return signal pressure or neutral advance signal pressure, are connected to neutral shuttle valve 256 (FIG. 3B), which connects the one of return line 205 or neutral advance line 264 having a signal pressure to 1-2-3 return line 331.

RETURN SIGNAL CONTROL VALVE

The return signal control valve 332 (FIG. 3B) has a spool 333 with three equal-diameter lands a, b, and c, slidable in a bore 334 and biased to 1st or low position shown by spring 335 engaging land c of spool 333 and located in chamber 336 in one end of bore 334 vented by exhaust 337. The 2-3 feed pressure supplied by 2-3 feed line 283 in 2nd and 3rd ratio ranges to operating chamber 338 in the opposite end of bore 334 at the opposite end of spool 333 to act on land a of spool 333 to move spool 333 against spring 335 to 2-3 position. With return signal control valve 332 and its spool 333 in 1st or low position shown, 1-2-3 return line 331 is connected to 1st or low return line 339 and 2-3 return line 341 is connected to exhaust 342. With return signal control valve 332 and its spool 333 in 2-3 position, 1-2-3 return line 331 is connected to 2-3 return line 341 and 1st return line 339 is connected to exhaust 343. The 1st or low return line 339 is supplied in neutral or pivot steer manual ranges by neutral advance line 264 or return line 205 and thus has pressure at all times and is supplied in forward and reverse manual ranges only in 1st and reverse ratio drive only with return signal pressure from return line 205.

ADVANCE SIGNAL CONTROL VALVE

The advance signal control valve 344 (FIG. 3B) has a spool 346 having three equal-diameter lands a, b, and c, and a piston 347 of the same diameter slidable in a bore 348. Piston 347 is engageable with land a of spool 346. A spring 349, seated on one end wall 350 of bore 348 and located in spring chamber 351 in bore 348 and vented by exhaust 352, engages land c of spool 346 to bias spool 346 to engage piston 347 which abuts the other or opposite end wall 353 of bore 348 when advance signal control valve 344 and its spool 346 are in the 1-3 position shown (FIG. 3B) in 1st and 3rd forward ratio ranges.

Reverse signal line 329 supplies reverse signal pressure to reverse chamber 354 in bore 348 between piston 347 and other end wall 353. The 2nd clutch line 356, which supplies 2nd clutch pressure to engage 2nd clutch 88, is connected to 2nd clutch chamber 357 in bore 348 between piston 347 and land a of spool 346. When the propulsion drive 13 is operating in reverse drive or 2nd forward ratio range drive, and thus either reverse signal line 289 supplies pressure to reverse chamber 354 or 2nd clutch line 356 supplies pressure to 2nd clutch chamber 357, the spool 346 is moved against spring 349 to R-2nd position.

The advance signal control valve in 1-3 position shown (FIG. 3B), connects 2-3 return line 341 to 2nd-minus ratio change feed line 358 and connects automatic advance line 266 to one branchline 359 of 1st ratio change feed line 361. The other branchline 360 of 1st-plus ratio change feed line 361 is blocked. In the R-2nd position, the advance signal control valve 344 reverses the connections and connects 2-3 return line 341 to the other branchline 360 and 1st ratio change feed line 361 and connects automatic advance line 266 to 2nd ratio change feed line 358. The one branchline 359 of 1st ratio change feed line 361 is blocked.

The 1st and 2nd ratio change feed lines 361 and 358 respectively provide a plus signal for changing displacement from maximum negative displacement toward or to maximum positive displacement in H1 or pump unit 41 to a lower negative displacement in H2 or motor unit 42, and a minus signal for oppositely changing displacement from any value toward or to maximum negative displacement in H1 and H2 units 41 and 42.

As shown in the following TABLE II, the 2nd ratio change feed line 358 provides the 2-3 return signal (R) in 3rd ratio range and the automatic advance signal (A) in Reverse and 2nd ratio ranges. The 1st ratio change feed line 361 provides the 2-3 return signal (R) in reverse and 2nd ratio ranges and the automatic advance signal (A) in 1st and 3rd ratio ranges.

TABLE II

| Manual Ranges | Ratio Ranges | Ratio Change Feed Lines | |
|---|---|---|---|
| | | 1st | 2nd |
| Fwd | 1 | A | O |
| Fwd | 2 | R | A |
| Fwd | 3 | A | R |
| Rev | Rev | R | A |
| N | N | O | O |

ZERO STROKE BIAS VALVE

The zero stroke bias valve 363 (FIG. 3A) is similar to the above U.S. Pat. No. 3,590,577 and has a valve spool 364 with two equal-diameter lands a and b slidable in a bore 365 in a valve sleeve 366. The spool 364 is connected by linkage 367, which includes a pin 368 and adjustment device 369, to pump ring 370. The pin 368 is secured to ring 370, which is the bearing ring and displacement change member moving proportionally to displacement, of known pump or H1 hydrostatic unit 42 of propulsion hydrostatic transmission 39.

The linkage 367 which connects pump ring 370 to valve spool 364 for common movement has adjustment device 369 so the position of the valve spool 364 can be manually adjusted to the proper position relative to the position of pump ring 370. The adjustment device 369, as shown, has a head apertured to receive pin 368 and a bolt portion secured to spool 364 and locked in the adjusted position by a locknut.

Valve sleeve 366 has a reverse return port 371 and a forward return port 372 and is slidable in bore 373 in valve body 169. Spring 374 in spring chamber 376 in valve body 169 is seated on spring seat 375 and engages abutment 380 on one end of valve sleeve 366 and biases valve sleeve 366 to the reverse position shown, with the other end engaging piston 377, which also is slidable in bore 373 in the valve body 169, and abuts the end wall 378.

In forward manual range, forward signal line 288 supplies forward signal pressure to chamber 379 in bore 373 in valve body 169 between end wall 378 and piston 377 and valve sleeve 366 so its opposite end engages spring seat 375 wall with sleeve 366 in forward position. Exhaust 381 vents the bore 365 of valve sleeve 366 between piston 377 and land b of spool 364 and bore 373 in valve body 169. At the other end of valve sleeve 366 these bores 365 and 373 are vented past spring seat 375 wall.

The 1st or low return line 339, which in neutral is always supplied since it is fed by both neutral advance line 264 and return line 205 and which in 1st and reverse ratio ranges is supplied only by return line 205, is connected via supply port 382 to the space between lands a and b of spool 346 for selective connection by reverse return port 371 to reverse return line 383 and 1st forward return port 372 to 1st forward return line 384. These reverse and 1st forward return ports 371 and 372 are formed in sleeve 366 as a plurality of progressively wider slots with the narrowest slot of each port at the regulating edge respectively of lands a and b of spool 364 so flow to reverse or 1st forward return lines 383 or 384 is proportional to the degree of error or deviation from the desired 1st and reverse ratio range anti-hunting or bias positions so the rate of change of correction is proportional to the error.

In the reverse position of zero stroke bias valve 363 with valve spool 364 in the central blocking position shown, the pump ring 370 is slightly displaced from null (N) or zero stroke position to a reverse bias (RB) position (FIGS. 3A and 4) having very low reverse or negative displacement. In response to a displacement position error due to higher or lower displacement from reverse bias (RB) position, the zero stroke bias valve 363 respectively provides reverse return signal in reverse return line 383 or forward return signal in 1st forward return line 384, functioning as a reverse advance signal, for correction.

In the forward position, in response to forward signal supplied by forward signal line 288, the valve sleeve 366 is moved to the left in FIG. 3A to forward position; and when valve spool 364 is in a similar central blocking position relative to reverse and 1st forward return ports 371 and 372, the pump ring 370 is in forward bias (FB) position (FIGS. 3A and 4), displaced a little from null (N) position, to a very low forward or positive displacement position. On displacement error from forward bias (FB) position to higher or lower displacement positions, zero stroke bias valve 363 respectively provides forward return pressure in 1st forward return line 384 or reverse return signal pressure, acting as forward advance signal pressure in reverse return line 383. This arrangement provides a damped minimum displacement control to prevent hunting of the displacement control by placing the hydrostatic pump, under low load providing creep torque and conditioning the propulsion drive 13 in forward or reverse manual range for immediate forward 1st ratio range or reverse ratio range drive in response to torque demand.

2-3-2 SHIFT SIGNAL VALVE

The 2-3-2 shift signal valve 386 has a spool 387 having two equal-diameter lands a and b slidable in a bore 388 which is in valve body 169 and is vented at both ends. Linkage 389, which is like linkage 367 of zero stroke bias valve 363 and has adjustment device 390, connects spool 387 to pump ring 370 for proportional movement.

The forward signal line 288 is always connected to the space in bore 388 between lands a and b of spool 387. The 2-3-2 shift signal line 391 is connected to its port 392, and when pump ring 370 and valve spool 387 are not in 2-3-2 shift position as shown (FIG. 3A), 2-3-2 shift signal line 391 is connected by its port 392 around land a of spool 387 to exhaust line 393 connected to bore 388 beyond land a of spool 387 for exhaust. When pump ring 370 and spool 387 are in the 2-3-2 shift position, land a of spool 387 closes exhaust line 393 and connects forward signal line 288 to supply 2-3-2 shift signal line 391.

1-2-1 SHIFT SIGNAL VALVE

The 1-2-1 shift signal valve 396 has a valve spool 397 having two equal-diameter lands a and b slidable in bore 398 and connected by linkage 399, like the above linkage 367, to motor ring 401. Bore 398 is vented at both ends. When motor ring 401 and thus valve spool 397 (as shown in FIG. 3A) of 1-2-1 shift signal valve 396 are in other than 1-2-1 shift position, 1-2-1 shift signal valve 396 connects 1-2-1 shift signal line 402 to exhaust 403. When motor ring 401 and 1-2-1 shift signal valve 396 are in 1-2-1 shift position, 1-2-1 shift signal valve 396 connects forward signal line 288 to supply 1-2-1 shift signal line 402.

ZERO STROKE INDICATOR VALVE

The zero stroke indicator valve 132 (FIG. 3D) has a spool 407 having two equal-diameter lands a and b slidable in a bore 408 vented at both ends thereof by 1st and 2nd exhausts 413 and 413'. Linkage 409, like linkage 367, connects spool 407 to pump ring 370. Mainline 112 is always connected to bore 408 between lands a and b of spool 407 and is blocked so there is only leakage flow to 1st and 2nd ports 410 and 410' in the zero or null (N) stroke position of spool 407 as shown in FIG. 3D. This leakage flow past lands a and b of spool 407, respectively, to 1st and 2nd ports 410 and 410' is permitted to escape at low pressure via 1st and 2nd restricted passages 412 and 412' and extending respectively from 1st and 2nd ports 410 and 410' beyond lands a and b of spool 407 and returning to bore 408 for exhaust by exhausts 413 and 413' at opposite ends of bore 408. This arrangement reduces leakage and the low pressure produced in zero stroke feed lines 411 and 411' is not significant.

When pump ring 370 moves from zero stroke or null (N) position in either direction, spool 407 moves to connect mainline 112 to selectively supply either of 1st or 2nd ports 410 or 410' and 1st and 2nd zero stroke feed lines 411 and 411'. After movement of ring 370 in one direction from zero stroke position (N), with land a of spool 407 moving to connect mainline 112 to 1st port 410 and 1st zero stroke feed line 411 and 1st restricted passage 412, with small further movement land a of spool 407 blocks the connection of 1st restricted passage to 1st exhaust 413 to close the leakage path, and land b of spool 407 has a large overlap of 2nd port 410' to prevent leakage. When pump ring 370 moves from zero stroke (N) position in the other or opposite direction, mainline 112 is similarly connected to oppositely disposed and similar 2nd port 410', 2nd zero stroke feed line 411', and then 2nd restricted passage 412' and 2nd exhaust 413' is closed by land b of spool 407, and the large overlap of land a of spool 407 relative to 1st port 410 reduces leakage. The 1st and 2nd zero stroke feed lines 411 and 411' are selectively supplied and when either one is supplied with zero stroke indicator signal pressure, the zero stroke shuttle valve 414 connects the zero stroke indicator signal pressure to zero stroke indicator signal line 416 whenever pump ring 370 is not in zero stroke (N) position. Thus zero stroke signal pressure at zero pressure provides the zero stroke signal.

ADVANCE TIME DELAY DEVICE

The advance time delay device 417 (FIG. 3B) has a piston 418 slidable in a bore 419 vented by exhaust 426 between piston 418 and end wall 422. Spring 421 seated on end wall 422 engages and biases piston 418 to the discharged position shown. In discharged or exhaust position, automatic advance line 266 is exhausted at neutral shift valve 127 and delayed automatic advance line 423 is connected by both its supply port 424 and exhaust port 425 to bore 419 and via bore 419 to exhaust 426. When neutral shift valve 127 supplies automatic advance line 266, automatic advance signal pressure is supplied via automatic advance line 266 through restriction 427 to expanding chamber 428 in bore 419 between piston 418 and end wall 430 to move piston 418 against the bias force of spring 421 during a predetermined time period to supply position. In this supply position, advance time delay device 417 connects automatic advance line 266 through restriction 427 and expanding chamber 428 to supply port 424 and delayed automatic advance line 423 and blocks exhaust port 425. When the supply port 424 is fully open, piston 418 engages stop 429 and exhaust 426 continues to vent the bore 419 between piston 418 and end wall 422.

2-3 OVERPRESSURE CUT-OFF VALVE

The 2-3 overpressure cut-off valve 431 (FIG. 3F) has a spool 432 having five equal-diameter lands a, b, c, d, and e, and a piston 433 of the same diameter, both slidable in a bore 434. A spring 436 seated on one end wall 437 in a spring chamber 438 vented by exhaust 439, engages land e of spool 432 to bias spool 432 so land a of spool 432 abuts piston 433 which, in turn, abuts the other end wall 441 in the normal position shown. In this normal position, the 2-3 overpressure cut-off valve 431 connects range feed line 267 between lands c and d of spool 432 to 1st range supply line 442 connects overpressure signal line 252 between lands d and e of spool 432 to exhaust 443 and blocks lock signal line 444 between lands a and b of spool 432. Also, lock chamber 446 between piston 433 and land a of spool 432 is connected to exhaust 448. Thus in normal position, the 2-3 overpressure cut-off valve 431 functions only to connect range feed line 266 to 1st range supply line 442.

The output or 2nd governor signal pressure line 157 and zero stroke indicator signal line 416 are connected to lock shuttle valve 445 which supplies the higher of 2nd governor pressure and zero stroke indicator signal pressure to lock signal line 444. When there is high hydrostatic overpressure as described below, high pressure safety signal valve 451 (FIG. 3A) connects mainline pressure from 2-3 feed line 283 to high pressure signal line 452. High pressure signal line 452, in 2-3 overpressure cut-off valve 431, is connected to high pressure signal chamber 453 between end wall 441 and piston 433 to act on piston 433 and move piston 433 and spool 432 against spring 436 to the cut-off position with land e of spool 432 abutting stop 454. The 2-3 overpressure cut-off valve 431 is thus moved to cut-off position only in 2nd and 3rd ratio ranges when there is a high hydrostatic overpressure.

The 2-3 overpressure valve 431, in cut-off position, provides the following connections: Range feed line 267 is connected between lands c and d of spool 432 to overpressure signal line 252 which is connected by return demand shuttle valve 251 to supply return demand signal line 227 so advance return signal system 160 only provides a return signal to return line 205, as explained above. The 1st range supply line 442 is connected between lands b and c of spool 432 to exhaust 448 to disestablish all ratio ranges, 1st brake 65, 2nd clutch 88, and 3rd clutch 72. The lock signal line 444 is connected between lands a and b of spool 432 to lock transfer line 447 to supply lock chamber 446 to lock 2-3 overpressure cut-off valve 431 in cut-off position until the high pressure signal in high pressure signal line 452 is discontinued indicating proper high hydrostatic pressure, until the zero stroke indicator signal pressure line 416 is exhausted indicating hydrostatic pump H1 is at substantially zero displacement, a displacement not greater than forward and reverse bias positions (FB), (RB), and until output governor pressure in 2nd governor pressure line 147 and vehicle speed are very low (e.g., 5 mph), so 1st ratio range drive can be smoothly reestablished.

RATIO RANGE SHIFT CONTROLS

Priority Valve

The ratio range shift controls 460 (FIG. 3E) are supplied by 1st range supply line 442 which is connected to priority valve 456 to immediately with priority, supply 2nd range supply line 457 and after mainline supply requirements are met, to supply 3rd range supply line 458.

Priority valve 456 has a valve spool 459, slidable in a bore 461 and biased by a spring 462 in a spring chamber 463 vented by exhaust 464, to the closed position shown connecting 1st range supply line 442 directly for full-flow to 2nd range supply line 457 and through restriction 466 to 3rd range supply line 458. Since 2nd range supply line 457 is only used as a hold-pressure in 1-2 shift valve 491 as explained below, its flow requirements are not significant. When the flow requirements of mainline 112 are met at a proper operating pressure (somewhat less than mainline pressure), priority valve 456 opens to provide a full-flow connection to 1st range supply line 442, used for all ratio range establishing supply and exhaust pressure control during ratio range disestablishing.

RATIO SHIFT SIGNAL VALVE

The ratio shift signal valve 257 (FIG. 3E) has a valve spool 468 having five equal-diameter spaced lands a, b, c, d, and e, slidably disposed in a valve bore 469, 1st and 2nd springs 471 and 472 seated on opposite ends of valve bores 469 and centering the valve spool 468 in valve bore 469. Ratio shift signal valve 257 also has 1st and 2nd pistons 473 and 474 of smaller diameter than spool 468 and slidably disposed in series in 1st piston bore 476 at one end of valve bore 469, and 3rd and 4th pistons 477 and 478 of the same smaller diameter slidably disposed in 2nd piston bore 479 at the other end of valve bore 469. The 1st and 2nd piston bores 476 and 479 have their outer ends closed and their central ends open to valve bore 469 so 2nd piston 474 can move within 1st spring 471 and engage land a of spool 468, and 3rd piston 477 can move within 2nd spring 472 and engage land e of spool 468.

The return chamber 481 in the 1st end of valve bore 469 containing 1st spring 471 is connected to return line 205, and advance chamber 482 in the 2nd end of valve bore 469 containing 2nd spring 472 is connected to delayed automatic advance line 423. When a return signal is present, valve spool 468 will be shifted to the right against 2nd spring 472 to downshift position, allowing a downshift signal from the ratio shift signal valve 257. When an advance signal is present, valve spool 468 will be shifted to the left against 1st spring 471 to upshift position allowing an upshift signal from ratio shift signal valve 257.

Hysteresis or damping is obtained by the rate of ratio change controls 203 and advance time delay device 417 which delays the engine overspeed or advance signal to upshift and promptly provide the engine underspeed or return signal to downshift. The valve bore 469 is connected with the following lines and exhausts which are located relative to valve spool 468 in the central position as follows. The 2-3-2 and 1-2-1 shift signal lines 391 and 402 are respectively blocked by lands b and d of spool 468. The exhausts 483, 484, and 485 are respectively blocked by lands a, c, and e of spool 468. The 3-2, 2-3, 2-1, and 1-2 shift signal lines 486, 487, 488, and 489, are respectively connected between successive lands, from land a to land e of spool 468.

The 2-1 shift signal line 488 is connected to the closed end of 1st piston bore 476 adjacent the outer end of 1st piston 473 and to 1-2 shift valve 491. The 3-2 shift signal line 486 is connected to 1st piston bore 476 between the 1st and 2nd pistons 473 and 474. The 1-2 shift signal line 489 is connected to 2nd piston bore 479 between 3rd and 4th pistons 477 and 478. The 2-3 shift signal line 487 is connected to the closed end of 2nd piston bore 479 adjacent the end of 4th piston 478. The 1-2 shift signal line 489 is connected to 1-2 shift valve 491, and the 3-2, 2-3, and 2-1 shift signal lines 486, 487, and 488 are connected to the 2-3 shift valve 492 to control the shift valves as explained below.

1-2 SHIFT VALVE

The 1-2 shift valve 491 (FIG. 3E) has a valve spool 493 having four spaced lands a, b, c, and d, and piston 494 of equal diameter, both slidably disposed in valve bore 496. A spring 497 is compressed in downshift chamber 498 in valve bore 496 between one end thereof and land a of spool 493. Spring 497 and pressure in downshift chamber 498 supplied by 2-1 shift signal transfer line 514 act on land a of spool 493 to bias spool 493 to 1st position shown. Pressure supplied by 1-2 shift signal line 489 to 1st upshift chamber 501 at the other end of bore 496 between piston 494 and spool 493, and pressure supplied by transfer line 506 to 2nd upshift chamber 502 between piston 494 and the end of bore 496, both bias spool 493 and 2nd position. The valve bore 496 is successively connected to and controls 1st exhaust line 503, 1st apply line 239, 3rd range supply line 458, 2-3 feed line 283, 2nd exhaust line 504, 2nd range supply line 457, transfer line 506, and exhaust 507. In 1st or downshift position shown, 3rd range supply line 458 is connected to 1st apply line 239 so 1st brake 65 or the 1st forward and reverse ratio friction establishing device, will be engaged. Also, the 2nd upshift chamber 502 is connected, via transfer line 506 and between lands c and d of spool 493, to exhaust 507, 2nd range supply line 457 is blocked by land c of spool 493, and 2-3 feed line 283 is connected between lands b and c of spool 493 to 2nd exhaust line 504. When a shift signal is present in the 1-2 shift signal line 489 and 1st upshift chamber 501, the valve spool 493 is moved to the left to 2nd or upshift position to connect 3rd supply line 458 to 2-3 feed line 283 and 1st apply line 239 to 1st exhaust line 503. Also the 2nd range supply line 457 is connected via transfer line 506 to 2nd upshift chamber 502 to act on piston 494 to hold valve spool 493 in the upshift position so that the 1-2 shift signal in line 489 does not have to be maintained after the 1-2 shift has been completed. The 1st exhaust line 503 is connected with 1st and 2nd trip valves 508 and 509, and the 2nd exhaust line 504 is connected with 2nd and 3rd trip valves 509 and 511, as described below.

2-3 SHIFT VALVE

The 2-3 shift valve 492 has the same structure as the 1-2 shift valve 491, so like reference numerals (primed) are used and the difference connections provided are now described.

The valve bore 496' (FIG. 3E) is successively connected to and controls 2nd exhaust line 504, 2nd apply line 356, 2-3 feed line 283, 3rd apply line 512, 3rd exhaust line 513, exhaust 516, 2-1 shift signal transfer line 514, and 2-1 shift signal line 488. In 2nd or downshift position shown, the 2-3 feed line 283 is connected to 2nd apply line 356 and 2nd exhaust line 504 is blocked so that if 1-2 shift valve 491 is upshifted, 2nd clutch 88 (the 2nd ratio engaging device) will be engaged. Also, 3rd apply line 512 is connected to 3rd exhaust line 513, and 2-1 shift signal line 488 is connected to 2-1 shift signal transfer line 514 which supplies downshift chamber 498' for downshift of 1-2 shift valve 491. When 2-3 shift signal line 487 supplies, from ratio shift signal valve 257, a 2-3 shift signal to 1st upshift chamber 501', valve spool 493' will be moved to the left against spring 497' to 3rd or upshift position, thereby connecting 2-3 feed line 283 to 3rd apply line 512 to engage 3rd clutch 72 and to supply 2nd upshift chamber 502' to maintain 2-3 shift valve 492 in the upshift position connecting 2nd apply line 356 to 2nd exhaust line 504 to disengage 2nd clutch 88. Also, the 2-1 shift signal line 488 is blocked and 2-1 shift signal transfer line 514 is connected to exhaust 516, so 1-2 shift valve 491 cannot be downshifted when 2-3 shift valve 492 is upshifted. The 3-2 shift signal line 486 is connected to downshift chamber 498' for downshift of 2-3 shift valve 492. The 3rd exhaust line 513 is connected to 2nd and 3rd trip valves 509 and 511.

TRIP VALVES

The 1st trip valve 508 (FIG. 3E) has a valve spool 518 having two lands a and b and a piston 519 of the same diameter slidably disposed in a valve bore 521. A spring 522 is compressed in vented chamber 523 and located between one end of valve bore 521 and land a of spool 518 to urge the valve spool 518 and piston 519 to the feed position shown in which 3rd range supply line 458 is connected by restricted feed line 525 to supply valve bore 521 between lands a and b of spool 518. Fluid pressure in a 1st chamber 526 between land b of spool 518 and piston 519 and also in a 2nd chamber 527 between piston 519 and the end wall of valve bore 521 act to move valve spool 518 against spring 522 to the exhaust position.

The 2nd and 3rd trip valves 509 and 511 have the same structure as 1st trip valve 508, so like reference numerals for the parts, respectively single and double-primed have been used with reference to be above description of 1st trip valve 508, and the connections are now described.

The 3rd range supply line 458 is connected to each restricted feed line 525, 525', and 525", respectively, of 1st, 2nd, and 3rd trip valves 508, 509, and 511 and also is connected via restriction 528 to low pressure exhaust line 529 which is regulated at a low pressure by relief valve 531. Low pressure exhaust line 529 is connected to each of 1st, 2nd, and 3rd trip valves 508, 509, and 511 and blocked respectively from bores 521, 521', and 521" by lands a, a' and a" of spools 518, 518', and 518". The 1st, 2nd, and 3rd exhaust lines 503, 504, and 513, are respectively connected to bores 521, 521', and 521", between lands a and b, a' and b', and a" and b", of 1st, 2nd, and 3rd trip valves 508, 509, and 511, and respectively by restrictions 532, 533, and 534, to low pressure exhaust line 529. In 1st trip valve 508, 2nd and 3rd apply lines 356 and 512 are respectively connected to 1st and 2nd chambers 526 and 527. In 2nd trip valve 509, 1st and 3rd apply lines 239 and 512 are respectively connected to 1st and 2nd chambers 526' and 527'. In 3rd trip valve 511, 1st and 2nd apply lines 239 and 356 are respectively connected to 1st and 2nd chambers 526" and 527".

The 1st trip valve 508 in the feed position shown during 1st ratio range drive, so on a 1-2 shift 1st exhaust line 503 is initially connected via restricted feed line 525 to 3rd range supply line 458 and via restriction 532 to low pressure exhaust line 529 so that initially on an upshift of the 1-2 shift valve 491, the 1st brake 65 will remain pressurized until 2nd clutch 88 reaches a predetermined pressure and torque transmitting level. Restriction 532 to low pressure exhaust line 529 limits the pressure in 1st exhaust line 503. When the pressure level in 2nd clutch 88 increases to this predetermined pressure, it is connected via 2nd apply passage 356 to 1st chamber 526 to move valve spool 518 against spring 522 to the left to the exhaust position. The 1st trip valve 508, in exhaust position, blocks restricted feed line 525 and connects 1st exhaust line 503 via valve bore 521 between lands a and b of spool 518, bypassing restriction 532 directly to low pressure exhaust line 529 to exhaust 1st brake 65. The 1st trip valve 508 will be similarly operated on a 1-3 shift when 3rd clutch 72 is engaged.

With the 2nd trip valve 509 in feed position shown, during 2nd ratio range drive, the 3rd range supply line 458 is connected through restricted feed line 525' to 2nd exhaust line 504 which is also connected by restriction 533 to low pressure exhaust line 529. On a 2-3 upshift to 3rd ratio range or a 2-1 downshift to 1st ratio range, 2nd exhaust line 504 will remain pressurized until the pressure in 3rd or 1st apply line 512 or 239 is sufficient to engage the 3rd clutch 72 or 1st brake 65 and to overcome spring 522' to shift valve spool 518' to block restricted feed line 525' and to connect 2nd exhaust line 504 for free flow to low pressure exhaust line 529 to disengage 2nd clutch 88. The 3rd trip valve 511, as shown, is in feed position during 3rd ratio range drive, so that 3rd range supply line 458 is connected via restricted feed line 525" to 3rd exhaust line 513 to maintain 3rd clutch 72 engaged during the initial portion of a downshift from 3rd ratio range until 2nd or 1st ratio range is engaged, as described above for the 2nd trip valve 509.

PROPULSION HYDROSTATIC TRANSMISSION

Propulsion hydrostatic transmission 39 has known variable displacement pump or H1 and motor or H2 hydrostatic units 41 and 42 respectively having pump and motor rings 370 and 401 pivotally supported by pins 535 and 536 mounted on housing 38 (FIG. 3A).

The pump and motor rings 370 and 401 respectively have a zero displacement or null positions (PN) and (MN). During drive operation, the pump ring 370 passes through null position (PN), but the motor ring 401 is not used in null position (MN).

The hydrostatic H1 unit or pump 41 has 1st or plus and 2nd or minus pump servos 537 and 538, piston and cylinder type fluid motors, which are fixed on housing 38 and operatively connected by their piston rods to pump ring 370 to change displacement. The 1st or plus pump servo 537 moves pump ring 370 in a positive direction toward or to maximum positive displacement position (P+) for 1st and 3rd ratio range drives 1,3. The 2nd or minus pump servo 538 moves pump ring 370 in a negative direction toward or to 2nd ratio range position 2, and then to maximum negative displacement position (P−) for reverse ratio range drives, as shown in FIG. 3A.

The hydrostatic motor 42 has similar 3rd or plus and 4th or minus motor servos 539 and 540 which are connected to motor ring 401 to move it respectively in a positive direction to an intermediate negative displacement position (MI), and in a negative direction to a maximum negative displacement position (M−), as shown in FIG. 3A.

The propulsion hydrostatic transmission 39 has known 1st and 2nd kidney passages 541 and 542 connecting pump and motor hydrostatic units 41 and 42, one carrying high hydrostatic pressure and the other carrying low hydrostatic pressure, depending on the direction of power flow, for transmitting power between the pump and motor units 41 and 42.

RATIO CHANGE ACTUATOR

The ratio change actuator 543 (FIG. 3B) is fixed on housing 38 and has an actuator piston 544 slidable in cylinder 545 which has 1st and 2nd end walls 546 and 547. Piston 544 has a rod 548 slidably sealed in an aperture in 1st end wall 546. A stop piston 551, slidable in a control cylinder 552, has a stop member 553 slidably sealed in an aperture in 2nd end wall 547 and extending into cylinder 545 to provide a two-position stop for actuator piston 544. Control cylinder 552 extends from 2nd end wall 547 to a 3rd end wall 555. An exhaust 554 vents the space in control cylinder 552 between stop piston 551 and 2nd end wall 547. In forward manual range, forward signal line 288 supplies forward signal pressure to the chamber 556 in control cylinder 552 between 3rd end wall 555 and stop piston 551 to act on stop piston 551 to position stop member 553 in cylinder 545 to limit movement of actuator piston 544 to 2nd and 3rd ratio maximum negative position 2. The actuator piston 544 is shown in the central null (AN) position.

When 2nd or minus actuator pressure is supplied by 2nd actuator line 558, actuator piston 544 is moved in forward range toward and to 2nd position 2, against stop member 553 in forward position shown, and in reverse range drive, further to reverse position (R), FIG. 3B. When 1st or plus actuator pressure is supplied by 1st actuator line 557, actuator piston 544 is moved toward and to the 1st and 3rd ratio range forward positions 1, 3, (FIG. 3B).

As pointed out above, advance signal control valve 344 supplies 1st (plus) and 2nd (minus) ratio change feed lines 361 and 358. Also, zero stroke bias valve 363 supplies reverse (minus) and forward (plus) return lines 383 and 384. The 1st or plus shuttle valve 561 connects the pressurized one of 1st or plus ratio change feed line 361 or forward return (plus) line 384 to 1st or plus actuator line 557. The 2nd or minus shuttle valve 562 connects the pressurized one of 2nd or minus ratio change feed line 358 or reverse return (minus) line 383 to 2nd or minus actuator line 558. The 1st and 2nd actuator lines 557 and 558 have advance (AP) and return (RP) pressures, as shown in TABLE III.

TABLE III

| DRIVE RANGES | | ACTUATOR LINES | |
|---|---|---|---|
| Manual | Ratio | 1st Plus (557) | 2nd Minus (558) |
| Fwd. | 1st | AP | Rev. RP |
| Fwd. | 2nd | RP | AP |
| Fwd. | 3rd | AP | RP |
| Rev. | 1st | Fwd. RP | AP |
| Neutral | N | Fwd. RP | Rev. RP |

In TABLE III, forward 1st and reverse, the signal pressures supplied are shown for operation above idle throttle when ratio governor 162 may provide advance pressure. At idle throttle in forward 1st and reverse, the signal pressures supplied are the same as in neutral under the control of zero stroke bias valve 363 to provide forward bias position (FB) in forward 1st and reverse bias position (RB) in reverse and neutral as explained above.

SERVO VALVES

The pump servo valve 563 (FIG. 3A) is a known rotary type having a spool 566, with four axial grooves arranged as two pairs of opposite grooves, and is rotatably mounted in a sleeve 568 having ports and being rotatably mounted in valve body 169. Pump servo valve 563 is used to deliver control pressure fluid to vary the displacement of H1 or pump hydrostatic unit 41. Control pressure line 564 delivers control pressure, regulated by propulsion control pressure regulator valve 138, through the ports in sleeve 568 to one pair of grooves in spool 566. The other pair of grooves are connected to exhaust 565.

The spool 566 is connected by linkage 567 for rotation by movement of actuator piston 544, and sleeve 568 is connected by linkage 569 for rotation by movement of pump ring 370. The pump servo valve 563 selectively delivers control pressure to 1st (plus) and 2nd (minus) pump control feed lines 571 and 572 which are respectively connected through overpressure system 573 (described below), to 1st and 2nd pump control supply lines 574 and 575 to 1st and 2nd pump servos 537 and 538.

The pump servo valve 563 functions such that as spool 566 is rotated clockwise, 2-Rev. movement, control pressure is distributed from control pressure line 564 through 2nd or minus control feed line 572 to control 2nd pump servo 538 which will cause the pump 41 to change displacement toward 2-R, or negative displacement position (P−). As the pump 41 changes displacement, the sleeve 568 rotates with movement of pump ring 370 to cause sleeve 568 to rotate clockwise to block this control pressure flow to 2nd pump servo 538 when the desired displacement has been reached. If spool 566 is rotated counterclockwise, 1, 3 movement, control pressure will be distributed to 1st pump (minus) servo control feed line 571 to control 1st pump servo 537 to cause the pump 41 to change displacement in the opposite direction toward 1, 3 position, the maximum positive displacement position (P+). Again, sleeve 568 will be driven by pump ring 370 until the desired displacement is achieved, and the pressure connections between control pressure line 564 and 1st pump control feed line 571 are closed.

The motor servo valve 576 (FIG. 3A) is like pump servo valve 563, so the same reference numerals (primed) have been used and reference is made to the above description of pump servo valve 563.

In motor servo valve 576, spool 566' is connected by linkage 578 to linkage 567 which is moved by actuator piston 544 to rotate spool 566 of pump servo valve 563 between an intermediate negative displacement position (MI−) and a maximum negative displacement position (M−).

In motor servo valve 576, the sleeve 568' is connected by linkage 578 to rotate with displacement change movement of motor ring 401. In response to movement of actuator piston 544, the spool 566' is moved in a negative or positive direction to selectively connect control pressure line 564 to 1st and 2nd motor control supply lines 579 and 580, respectively, connected to 1st (plus) and 2nd (minus) motor servos 539 and 540 of motor hydrostatic unit 42 to move motor ring 401 toward maximum negative displacement position (M−), or toward intermediate negative displacement position (MI−).

PROPULSION HYDROSTATIC CHARGING SYSTEM

In the propulsion hydrostatic charging system 134 (FIG. 3A), mainline 112 is connected via 1st and 2nd check valves 581 and 582 to feed charging fluid to the one of 1st or 2nd kidney feed lines 583 or 584 and connected 1st or 2nd kidney passages 541 or 542 having low hydrostatic pressure. The 1st and 2nd kidney feed lines 583 and 584 also supply 1st and 2nd kidney pressures to 1st and 2nd kidney pressure signal lines 586 and 587.

OVERPRESSURE SYSTEM

In the overpressure system 573 (FIG. 3A) there is a propulsion stroke limiter valve 588 which connects 1st and 2nd pump control feed lines 571 and 572 to 1st and 2nd pump control connecting lines 589 and 590, which are connected by safety mode valve 591 respectively to 1st and 2nd pump control supply lines 574 and 575 for supplying regulated control pressure to 1st and 2nd pump servos 537 and 538 to control displacement of pump hydrostatic unit 41 only when the high kidney pressure is in a normal pressure range. When the high kidney pressure is higher (overpressure), the propulsion stroke limiter valve 588 and safety mode valve 591 function to decrease high control pressure and thus high hydrostatic kidney pressure.

PROPULSION STROKE LIMITER VALVE

The propulsion stroke limiter valve 588 (FIG. 3A) is a known type stroke limiter valve, like the steer stroke limiter valve 592 described below.

The propulsion stroke limiter valve 588 under overload, higher than normal high kidney pressure, indicative of torque overload in propulsion hydrostatic transmission 39, acts in response to high kidney pressure supplied by one of 1st or 2nd kidney pressure signal lines 586 or 587 to sequentially limit, interrupt, and then reverse the control pressure supplied to 1st and 2nd pump servos 537 and 539. Thus the degree of stroke or displacement request by ratio change actuator 543 is overridden to first decrease control pressure permitting a decrease in displacement and then to reverse control pressures for a positive decrease in displacement to reduce high kidney pressure to the normal range.

SAFETY MODE VALVE

The safety mode valve 591 (FIG. 3A) has a spool 593 having five equal-diameter lands a, b, c, d, and e, slidable in bore 594. Spring 596 is seated in the vented end of bore 594 and engages land a of spool 593 to bias spool 593 to connecting position shown. The 2-3 feed line 283 is connected to chamber 597 at the opposite end of bore 594 to act on land e of spool 593 to move spool 593 against spring 596 in 2nd and 3rd ratio ranges to the safety mode position. In connecting position, safety mode valve 591 connects 1st and 2nd pump control connecting lines 589 and 590 to 1st and 2nd pump control supply lines 574 and 575. 1st and 2nd control supply branch-lines 598 and 599 are blocked and 1st and 2nd overpressure signal lines 601 and 602 are connected to 1st and 2nd exhausts 603 and 604 so high pressure safety signal valve 451 is closed.

In safety mode position of safety mode valve 591, 1st and 2nd pump control feed lines 571 and 572 are connected by 1st and 2nd control branchlines 598 and 599 which bypass propulsion stroke limiter valve 588 and are connected through safety mode valve 591 to 1st and 2nd pump control supply lines 574 and 575 for 1st and 2nd pump servos 538 and 539. 1st and 2nd pump control feed lines 571 and 572 are also connected through propulsion stroke limiter valve 588, 1st and 2nd pump control connecting lines 589 and 590, safety mode valve 591 and 1st and 2nd overpressure signal lines 601 and 602 to high pressure safety signal valve 451.

HIGH PRESSURE SAFETY SIGNAL VALVE

High pressure safety signal valve 451 (FIG. 3A) has a spool 605 having equal-diameter lands a and b slidable in valve bore 606, and 1st and 2nd pistons 607 and 608 of smaller diameter arranged in series in coaxial smaller diameter piston bore 609 which is closed at its outer end and open to one end of valve bore 606 which is vented by exhaust 613. Spring 611, seated on the other vented end of valve bore 606, engages land b of spool 605 to bias spool 605 to engage 1st piston 607 which, in turn, engages 2nd piston 608 against the closed outer end of piston bore 609 to thereby place high pressure safety signal valve 451 in the closed position shown connecting high pressure signal line 452 to the exhaust 612 and blocking 2-3 feed line 283.

When a high overpressure signal indicating overpressure is supplied by either of 1st or 2nd overpressure signal lines 601 or 602, to piston bore 609 between 1st and 2nd pistons 607 and 608, or to the end of piston bore 609 to act on 1st piston 607 to move valve spool 605 to over-pressure position, 2-3 feed line 283 is connected to high pressure signal line 452 which controls the 2-3 overpressure cut-off valve 431, as explained above.

CONTROL PRESSURE REGULATION SYSTEM

The control pressure regulation system 616 (FIG. 3A) has hydrostatic control pump 136 supplied by mainline 112 and supplying control pressure line 564 regulated by propulsion control pressure regulator valve 138 which is controlled by high kidney pressure from both the propulsion and steer hydrostatic transmissions 39 and 89.

PROPULSION SHUTTLE VALVE

The propulsion shuttle valve 617 (FIG. 3A) has a spool 618 having three equal-diameter lands a, b, and c, slidable in a bore 619. In propulsion pump hydrostatic unit 41, 1st and 2nd kidney pressure supply lines 621 and 622 supply 1st and 2nd kidney pressures to propulsion shuttle valve bore 619 and also, via 1st and 2nd restrictions 623 and 624, to 1st and 2nd chambers 626 and 627 at opposite ends of bore 619. When, as shown, 2nd kidney pressure is higher than 1st kidney pressure, the higher 2nd kidney pressure in 2nd chamber 627 moves valve spool 618 to the position shown and connects 2nd kidney pressure supply line 622 to supply propulsion high kidney pressure line 629, and the lower kidney pressure in 1st kidney pressure supply line 621 to supply propulsion low kidney pressure line 630. When 1st kidney pressure is the higher pressure, this pressure in 1st kidney pressure supply line 621 similarly acts in 1st chamber 626 to move valve spool 618 to the opposite end to connect the higher 1st kidney pressure to propulsion high kidney pressure line 629 and the lower 2nd kidney pressure to propulsion low kidney pressure line 630.

LOW CHARGE SIGNAL VALVE

The propulsion hydrostatic transmission 39 has a low charge signal valve 631 (FIG. 3A) having a spool 632 with equal-diameter lands a and b slidable in a valve bore 633. Spring 634 in vented chamber 636 is seated on the end of bore 633 and engages land b of spool 632. Low kidney pressure is supplied by propulsion low kidney pressure line 630 to chamber 637 to act on land a of spool 632 to oppose the spring bias force. When low kidney pressure is abnormally low, spring 634 overcomes the low kidney pressure bias to move spool 632 to the low charging pressure position shown, connecting mainline 112 to underpressure or low charge pressure signal line 253 connected to return demand shuttle valve 251 (FIG. 3F) to supply return demand line 227, as pointed out above.

When low kidney pressure has normal low pressure in a range of normal low kidney pressure values, this normal pressure in chamber 637 moves valve spool 632 against spring 634 to block mainline 112 and to connect underpressure signal line 253 to exhaust 638.

1ST OR CONTROL PRESSURE REGULATOR VALVE

The 1st or control pressure regulator valve 641 (FIG. 3A) has a spool 642 having equal-diameter lands a and b slidable in bore 643 and biased by biasing assembly 644 to the closed position shown. Control pressure line 564 is always connected to the bore 643 between lands a and b of spool 642 to a continuing portion of control pressure line 564 and by restricted passage 646 to the chamber 647 at one end of bore 643 to act on land b of spool 642 to bias valve spool 642 toward regulating or open position when the force provided by regulated control pressure in chamber 647 overcomes the bias force of biasing assembly 644. In the regulating position, control pressure line 564 is connected to exhaust to the lower pressure mainline 112.

The biasing assembly 644 has a spring 648 seated in a vented spring chamber 649 and engaging annular thrust member 651 against the step 652 between spring chamber 649 and bore 643 in the closed position of spool 642 shown, and against land a of spool 642 in regulating position. The biasing assembly 644 also has 1st and 2nd pistons 653 and 654 slidable in series in piston bore 656 which has a closed end and opens into spring chamber 649 and is coaxial with valve bore 643.

High propulsion kidney pressure supplied by propulsion high kidney pressure line 629 to piston bore 656 biases 2nd piston 654 to engage land a of spool 642 in regulating position. Similarly, steer high kidney pressure line 657 is connected to the closed end of piston bore 656 to act on 1st piston 653 and through 2nd piston 654 on land a of spool 642. Thus the higher kidney pressure of the propulsion and steer high kidney pressures supplied by lines 629 and 657 determines the bias force. The control pressure in control pressure line 564 thus has an intermediate pressure value (e.g., 400 psi), determined by spring 648 which is higher than mainline pressure and increases in proportion to the higher of the propulsion or steer high kidney pressure to a maximum. Mainline 112 is connected by check valve 137 (FIG. 3A) for flow to control pressure line 564 to ensure that control pressure is never less than mainline pressure.

STEER CONTROL SYSTEM

Hydrostatic Transmission Controls

The hydrostatic drive controls 131 include steer hydrostatic drive controls 661 (FIG. 3D) to control the displacement position of steer pump ring 662 of variable displacement pump 90 of steer hydrostatic transmission 89. The fixed displacement motor 91 has a fixed ring (not shown). The steer pump ring 662 is pivotally mounted on a pin 663 fixed in housing 38 and positioned by 1st and 2nd steer servos 664 and 665 from null position (SN) for straight drive, and by 1st steer servo 664 to 1st position for left steer, and by 2nd steer servo 665 to 2nd position for right steer. Steer pump 90 and motor 91 have 1st and 2nd kidney passages 666 and 667, one passage having high kidney pressure and the other having low kidney pressure—depending on the direction of steer.

STEER CHARGING SYSTEM

Mainline 112 is connected (FIG. 3D) by 1st and 2nd check valves 668 and 669 respectively to 1st and 2nd steer kidney feed lines 671 and 672 to feed charging pressure to 1st and 2nd steer kidney passages 666 and 667.

STEER SHUTTLE VALVE

The steer shuttle valve 673 (FIG. 3D) is the same as propulsion shuttle valve 617 so like reference numerals (primed) have been used for the same parts, and reference is made to the above description of propulsion shuttle valve 617.

The 1st and 2nd steer kidney passages 666 and 667 are respectively connected by 1st and 2nd steer kidney pressure lines 674 and 675 to steer shuttle valve 673 which connects the high steer kidney pressure to steer high kidney pressure line 657 and low steer kidney pressure to steer low kidney pressure line 678.

2ND OR STEER CONTROL PRESSURE REGULATOR VALVE

The 2nd or steer control pressure regulator valve 139 (FIG. 3D) has a valve spool 682 having three equal-diameter lands a, b, and c, slidable in valve bore 683, and a larger diameter abutment portion 684 located within a spring 686 in a larger diameter piston bore 687. Piston 688 has a larger diameter than valve spool 682 and is slidable in piston bore 687 and biased to the right by spring 686. Exhaust 689 provides a vent between valve bore 683 and piston bore 687. Steer low kidney pressure line 678 is connected through a restriction 691 to chamber 692 at the closed end of piston bore 687 to act on and move piston 688 against the bias force of spring 686 to provide a net bias force acting on abutment portion 684 and thus on valve spool 682.

The steer control pressure lines 693 is connected to a closed chamber 694 to act on piston 696 which has a smaller diameter than valve spool 682, and is slidable in piston bore 697 and engages land a of spool 682 to provide a regulated steer control pressure bias force on valve spool 682 opposing the above net bias force. Exhaust 698 vents the step between valve bore 683 and piston bore 697.

When the low steer kidney pressure in chamber 692 provides a net bias force greater than the opposing regulated steer control pressure bias force, the 2nd or steer control pressure regulator valve 139 is in the connecting position shown, and control pressure line 564 is connected to steer control pressure line 693, and mainline 112 is connected to link feed line 699. When the regulated steer control pressure bias force overcomes the net bias force, the steer control pressure in line 693 is regulated at lower pressure values or is cut off, and link feed line 699 is connected to exhaust 701 to discontinue operation of steer override link 704 and steering as described below.

STEER SERVO VALVE

The steer servo valve 702 (FIG. 3D) is constructed like the above-described propulsion pump servo valve 563, so like reference numerals (double-primed) have been used and reference is made to the above description of valve 563.

In steer servo valve 702, valve spool 566" is connected by lever or linkage 703 to steer override link 704. Valve sleeve 568" is connected by linkage 706 to pin 707 on steer pump ring 662.

Steer control pressure line 693 supplies steer servo valve 702 which, like the above-described servo valves, functions in response to rotation of valve spool 566" to selectively supply 1st and 2nd steer feed lines 708 and 709 which are normally connected through steer stroke limiter valve 592, respectively, to 1st and 2nd steer supply lines 711 and 712, and 1st and 2nd steer servos 664 and 665, to change steer pump displacement in the requested direction. This causes movement of steer pump ring 662 and follow-up movement through linkage 706 of valve sleeve 568" to a closed position (as shown) to block flow to 1st and 2nd steer feed lines 708 and 709.

STEER STROKE LIMITER VALVE

The steer stroke limiter valve 592 (FIG. 3D) has a spool 714 having five equal-diameter lands a, b, c, d, and e, slidable in valve bore 715. The 1st steer kidney pressure signal line 716 is connected to a 1st chamber 718 of the 1st biasing assembly 719 to act on the end of land e of spool 714. The 1st biasing assembly 719 also has a 1st spring 721 seated in 1st chamber 718 and biasing 1st thrust washer 722 against a 1st shoulder 723 between valve bore 715 and 1st chamber 718 to contact land e of spool 714 to hold spool 714 in the central position shown.

The 2nd steer kidney pressure signal line 717 is connected to 2nd chamber 718' of 2nd biasing assembly 719' which, like 1st biasing assembly 719, has a 2nd spring 721', 2nd thrust washer 722', and 2nd shoulder 723'.

Opposing 1st and 2nd springs 721 and 721' act on spool lands e and a to hold valve spool 714 in the central position shown as long as the pressure differential between the opposing 1st and 2nd steer kidney pressure signals acting on opposite lands e and a of spool 714 is insufficient to overcome the bias force of the opposing spring. The 1st and 2nd biasing assemblies 719 and 719' have 1st and 2nd stop members 724 and 724' to limit movement of valve spool 714.

In the central position shown, 1st and 2nd steer feed lines 708 and 709 are connected by steer stroke limiter valve 592 respectively to 1st and 2nd feed branchlines 726 and 727 of 1st and 2nd steer supply lines 711 and 712, to directly and freely connect 1st and 2nd steer feed lines 708 and 709 to 1st and 2nd steer supply lines 711 and 712. The 1st and 2nd steer supply lines 711 and 712 also have respectively 1st and 2nd exhaust branchlines 728 and 729 blocked by spool lands e and a, with spool 714 in central position. Valve spool 714 also has 1st and 2nd passages 731 and 732 formed therein respectively connecting the space between spool lands a and b to 2nd chamber 718' and connecting the space between spool lands d and e to the 1st chamber 718.

When, for example, 1st steer kidney pressure excessively exceeds 2nd steer kidney pressure, or there is 1st steer kidney overpressure, this higher pressure in 1st chamber 718 overcomes 2nd spring 721' and lower 2nd steer kidney pressure in 2nd chamber 718' of the 2nd opposite biasing assembly 719' to move valve spool 714 to restrict the flow and thus reduce the steer control pressure delivered from 1st steer feed line 708 to 1st feed branchline 726 and 1st steer supply line 711 to 1st steer servo 664 to permit displacement decrease to reduce 1st steer kidney pressure. Since the reaction force on steer pump ring 662 and thus steer control pressure requirements are proportional to high steer kidney pressure, reducing the steer control pressure will reduce high steer kidney pressure. If 1st steer kidney overpressure continues, valve spool 714 continues to move in the same direction and is connected by 1st steer kidney pressure signal line 716, 1st chamber 718, 2nd passage 732 in spool 714, 2nd feed branchline 727, and 2nd steer supply line 712, to 2nd steer servo 665; and 1st steer servo 664 is connected, via 1st steer supply line 711, its 1st exhaust branchline 728 and 1st passage 731 in spool 714, to 2nd chamber 718' having low steer kidney pressure.

These connections provide a reversal of pressures in 1st and 2nd steer servos 664 and 665 to positively reduce displacement of pump 90. Should there be 2nd steer kidney overpressure, the higher 2nd steer kidney signal pressure moves valve spool 714 in the opposite direction to reduce and then reverse control steer supply pressure in the same manner to reduce displacement to reduce high steer kidney pressure.

STEER SIGNAL VALVE

The steer signal valve 166 (FIG. 3D) has a spool 734 having equal-diameter lands a and b slidable in a bore 735. Both spring 736 and steer signal pressure in 1st chamber 737, supplied by steer signal line 326 from disconnect clutch valve 125, act on the end of land b of spool 734 to provide a bias force to move spool 734 to the closed position shown. The input or 1st governor pressure line 165 is connected to a 2nd chamber 738 to provide a bias pressure to move valve spool 734 to the open position.

When steer signal valve 166 is in the closed position shown, link feed line 699 is blocked by land a of spool 734 and link supply line 741 is connected to exhaust 742 to disable steer override link 704, as described below. In the open position, steer signal valve 166 connects link feed line 699 to link supply line 741 to supply and enable steer override link 704 to transmit steer request signals.

When manual range control 254 (FIG. 3B) is in neutral position, disconnect clutch valve 125 supplies mainline pressure, via steer signal line 326, to 1st chamber 737, so steer signal pressure and spring 736 close steer signal valve 166 against any engine speed governor pressure supplied by 1st governor line 165 to 2nd chamber 738 to exhaust link supply line 741 to disable steer override link 704 at all engine speeds.

When the manual range control 254 is shifted from neutral range to any operating range—forward, pivot steer, or reverse, the steer signal line 326 is exhausted at disconnect clutch valve 125 to exhaust 1st chamber 737. Then engine governor pressure, at normal engine speeds providing sufficient power for steer operation supplied by 1st governor line 165 to 2nd chamber 738, moves spool 734 against spring 736 to the open position. Then if the steer hydrostatic transmission 89 is properly supplied by steer hydrostatic charging system 135 so that there is a proper low kidney pressure in one of 1st and 2nd steer kidney passages 666 and 667, the 2nd steer control pressure regulator valve 139 supplies mainline pressure to link feed line 699 which is connected by the open steer signal valve 166 to link supply line 741 to enable steer override link 704 to transmit steer request.

STEER OVERRIDE LINK

The steer override link 704 which is a follow-up hydromechanical link (FIG. 3D), has a spool 744 having two equal-diameter lands a and b, slidable in a sleeve bore 746 in sleeve 747 which is slidable in body bore 748 in fixed valve body 169. The steer request lever 196 (FIG. 3C) is connected by steer request linkage 197' to stem 750 of valve spool 744 to move spool 744 from the central null position (N) shown toward or to either 1st or 2nd steer position. The body bore 748 has 1st and 2nd end portions 751 and 751' extending beyond the sleeve 747 at 1st and 2nd opposite ends 752 and 752' of sleeve 747. Body bore 748 also has at respectively opposite ends 1st and 2nd end walls 753 and 753' enclosing 1st and 2nd spring chambers 754 and 754' which are vented by 1st and 2nd exhausts 755 and 755'. The 1st and 2nd springs 757 and 757' are respectively located in 1st and 2nd spring chambers 754 and 754' and seated on end walls 753 and 753' and engage 1st and 2nd pistons 758 and 758' which are slidable in 1st and 2nd bore end portions 751 and 751' of body bore 748. Piston rod 759 is fixed to 1st piston 758, extends through 1st guide opening 761 in 1st end wall 753, and is operatively connected by lever or linkage 703 to rotate spool 566" of steer servo valve 702 in response to reciprocal movement of 1st piston 758. Stem 750 of valve spool 744 extends through 2nd guide opening 761' in 2nd end wall 753', through, and is slidably sealed in opening 762 in 2nd piston 758'.

Link supply line 741 is connected through ports 740 which are axially extending grooves and ports in and between body and sleeve 747 for flow to sleeve bore 746 between lands a and b of spool 744 in all positions of spool 744 and sleeve 747. In response to null (N) or straight steer request, steer request linkage 197' positions spool 744 in the null position shown in FIG. 3D with lands a and b of spool 744 respectively blocking flow from sleeve bore 746 and between spool lands a and b to 1st and 2nd transfer passages 763 and 763' so 1st and 2nd springs 757 and 757', center sleeve 747, and 1st and 2nd pistons 758 and 758' abut 1st and 2nd ends 752 and 752' of sleeve 747. Thus piston rod 759 and steer servo valve 702 are in null (N) position. The 1st transfer passage 763 has a port 764 blocked by land a of spool 744 in null position and a groove 765 in sleeve 747 connected by port 766 to sleeve bore 746 between spool land a and piston 758 to 1st end portion 751 of body bore 748. 2nd transfer passage 763' is similar so the same reference numerals (primed) are used.

On steer request toward or to 1st steer position, steer request linkage 197' moves valve spool 744 upwardly in FIG. 3D to connect link supply line 741 via sleeve bore 746 and 1st transfer passage 763 to 1st end portion 751 of body bore 748 to act on 1st piston 758 to move 1st piston 758 toward 1st steer position. During this follow-up movement, the leakage past 2nd piston 758' is larger than the leakage past spool land b so leakage fluid therebetween does not affect follow-up movement. The 2nd spring 757' acting through 2nd piston 758' engaging 2nd end portion 752' of sleeve 747 causes sleeve 747 to follow 1st piston 758, and when 1st end portion 752 engages 1st piston 758, the spool lands a and b will again block both 1st and 2nd transfer passages 763, 763' when the position toward or to 1st position of 1st piston rod 759 corresponds with such position of valve spool 744.

Steer request toward or to 2nd steer position moves valve spool 744 in the opposite direction similarly connecting link supply line 741 past land b of spool 744 to 2nd transfer passage 763' to move 2nd piston 758' against 2nd spring 757'. The piston rod 759, 1st piston 758, and sleeve 747 similarly follow 2nd piston 758', and in the requested steer position spool land b blocks flow to 2nd transfer passage 763' to stop movement.

VEHICLE SERVICE BRAKE SYSTEM

The vehicle service brake system 141 has a brake apply valve 771, a brake signal valve 772, and a brake coolant valve 773.

BRAKE APPLY VALVE

The brake apply valve 771 (FIG. 3E) has a regulating spool 776 having a small diameter land a slidable in a small diameter bore 777, and a larger diameter land b slidable in a large diameter bore 778, and a control spool 779 of the same large diameter as spool land b, and having equal-diameter lands c and d slidable in large diameter bore 778. Spring 781 is seated in recess 782 formed in control spool 779 at the end facing regulating spool 776 and engages large diameter land b of regulating spool 776. A rod 783 is secured to control spool 779 at the base of recess 782 and extends through rod bore 784 in regulating spool 776 and has a stop 786 secured on the end of rod 783 to limit relative separating movement of regulating and control spools 776 and 779 in the brake-OFF position shown. Rod 783 has sufficient clearance in rod bore 784 for free movement of regulating spool 776 on rod 783 and for free flow of leakage fluid through rod bore 784. The large diameter bore 778 between regulating and control spools 776 and 779 is vented to exhaust 787. Chamber 788 at the end of small diameter bore 777 may be vented by its exhaust 789 and/or, via rod bore 784, to exhaust 787.

As the vehicle brake pedal 791 is moved for increasing brake demand, a mechanical or hydraulic linkage 792 applies a force to the end 793 of control spool 779 to move control spool 779 to compress spring 781 to apply a proportionately increasing apply force to large land b of regulating spool 776. This apply force moves regulating spool 776 from brake-OFF position, connecting brake apply line 794 to exhaust 796 to brake-ON regulating position connecting mainline 112 or exhaust to regulate brake apply pressure proportionally to this apply force and brake demand. The control spool 779 in brake-OFF position connects brake-ON signal line 797 to exhaust 798 and then in response to initial movement of pedal 791 for low brake apply or during the slack take-up movement, blocks exhaust 798 and connects mainline 112 to brake-ON signal line 797 to provide brake-ON signal pressure. Brake apply line 794 has a restricted exhaust 799 to provide flow to stabilize regulation of brake apply pressure.

BRAKE SIGNAL VALVE

The brake signal valve 772 (FIG. 3E) has a spool 802 having equal-diameter lands a and b slidable in valve bore 803. Piston 804, having a stem 805, is slidable in larger piston bore 806 which at one end is closed by end wall 807 and at its other end is coaxially open to valve bore 803 at the step 808 between these valve and piston bores. A spring 809 is seated between piston 804 and annular member 811 seated on step 808 and biases piston 804 against end wall 807 in 2–3 ratio range and brake-OFF position shown.

The 1st apply line 239 is connected by restriction 812 to 1st chamber 813 between end wall 807 and piston 804. Piston bore 806 is vented at step 808 by an exhaust 814. The brake-ON signal line 797 is connected to brake chamber 816 at the closed end of valve bore 803 so brake-ON signal pressure acts on land b of spool 802.

In 1st ratio range, 1st apply pressure in 1st chamber 813 is fed through the restriction 812 and thus slowly moves piston 804 against the spring 809 so piston stem 805 engages spool land a to position valve spool 802 in brake signal-OFF position shown, blocking brake apply line 794 and connecting brake apply signal line 184 to exhaust 817 so there is no brake apply signal pressure supplied to brake apply signal line 184. In 2nd and 3rd ratio ranges, 1st apply pressure is exhausted via restriction 812 so spring 809 slowly moves piston 804 to the released position shown, so valve spool 802 is free to move to either the brake apply signal-ON or OFF position.

When the brakes are off, since there is no brake apply pressure in brake apply line 794 and no brake-ON signal pressure in brake signal line 797, valve spool 802 connects brake apply signal line 184, if in brake-OFF position, to exhaust 817 and, if in the brake-ON position, to exhausted brake apply line 794, so there is no brake apply signal pressure. When the brakes are applied before any brake apply or during the slack take-up period, brake-ON signal pressure via brake-ON signal line 797 is supplied to brake chamber 816 to move valve spool 802 to the brake-ON position connecting brake apply line 794 to brake apply signal line 184 to supply brake apply pressure to ratio governor 162.

BRAKE COOLANT VALVE

The brake coolant valve 773 (FIG. 3F) has a spool 822 having one large diameter land a slidable in a large diameter bore 823. Valve spool 822 has at one end thereof a small diameter guide stem 824 slidably mounted in a guide bore 826 in the end wall 827 of sleeve member 828. Sleeve member 828 fits and is fixed and sealed in large diameter valve bore 823 to body 169. A spring 829 is seated on end wall 827 and engages valve spool land a to bias spool 822 so that land a is sealed against the step 831 between large diameter valve bore 823 and the small diameter bore 832 in the brake-OFF position as shown. Valve spool 822 also has at the other end thereof a rod 833 with a piston 834 slidably in small diameter bore 832. Brake-ON signal line 797 is connected to a chamber 836 at the closed end of small diameter bore 832 to act on piston 834 to move valve spool 822 to the brake-ON position.

Lube line 115, which also feeds the hydro-lube system 837 for lubrication of both the propulsion and steer hydrostatic transmissions 39 and 89, is connected to a port 838. Port 838 is an annular recess in the large diameter valve bore 823 and is wider than land a of spool 822 so the port 838 is not blocked in any position of land a. In the brake-OFF position shown, lube line 115 is connected via port 838 to large diameter valve bore 823 to supply gear lube line 839 and gear lube system 840 for lubrication of all gearing of the propulsion and steer drives 13 and 14. Such lube systems have a downstream restriction and then exhaust fluid to the sump 111, so gear lube line 839 has a lube relief valve 841.

In this brake-OFF position, one side of land a of spool 822 is sealed against step 831 so there is no lube fluid flow through brake coolant valve 773 directly to brake coolant line 842, but gear lube line 839 supplies a metered amount of lube fluid via restricted passage 844 to brake coolant line 842 and brake cooling system 843.

On initial brake demand, brake apply valve 771 supplies brake-ON signal line 797 which is connected to chamber 836 of brake coolant valve 773 to move valve spool 822 against the spring 829 to the brake-ON position where the other side of land a of spool 822 engages the end 846 of sleeve member 828 which functions like step 831 so lube line 115 is disconnected from gear lube line 839 and connected via port 838 to brake coolant line 842 and brake cooling system 843 for high volume coolant flow just before the vehicle service brakes 37 and 37' are applied. The brake coolant line 842 and cooling system 843 have some downstream restriction so brake coolant pressure in brake coolant line 842 supplies, via restricted passage 844, a metered amount of lube fluid to gear lube line 839 and system 840.

OPERATION

Fluid Supply

While the above description describes the operation of the controls with reference to each component, it is believed desirable to describe the overall drive operation.

When the input shaft 18, or another suitable shaft in input drive 12, is driven by engine or overrun drive, the main pump 110 (FIG. 3F) is driven and supplies mainline pressure to mainline 112 at a constant pressure value (e.g., 150 psi) when flow requirements are met.

Mainline 112 supplies the following parts of control system 11: basic signal controls 116 for automatic operation; the valves controlled electrohydraulically by the manual range control 254; disconnect clutch valve 125; neutral shift valve 127; forward and reverse signal valves 128 and 129; inhibitor valve 126; the propulsion and steer charging systems 134 and 135 for propulsion and steer hydrostatic transmissions 39 and 89; the similarly driven hydrostatic control pump 136; zero stroke indicator valve 132; the 2nd or steer control pressure regulator valve 139 to supply link feed line 699 for steering; and vehicle service brake system 141. Hydrostatic control pump 136 supplies 1st propulsion and 2nd steer control pressure lines 564 and 693. Main regulator valve 114 supplies overage fluid flow to lube line 115 for the lube systems.

Mainline 112 supplies basic signal controls 116. Modulator valve 117 supplies modulator pressure directly proportional to compressor discharge pressure, and thus engine power, to engine power signal line 146. Output speed governor 118 and output governor signal valve 119 supply output or 2nd governor pressure proportional to output speed above a minimum speed to output or 2nd governor signal pressure line 157. Engine or input governor 161 supplies 1st or input governor pressure to 1st or input governor pressure line 165. The advance return signal system 160, having ratio governor 162, feeds advance and return signals in response respectively to overspeed or underspeed relative to a controlled set speed via return demand control 206 and rate of ratio change control 203 to propulsion ratio control 121. In ratio governor 162, the flyweight assembly 172 and spring 173 determine idle set speed for idle throttle, no steer request, idle engine power, and no brake demand. The throttle and steer request device 190, through throttle demand and steer request cams 188 and 189, increase the set speed in predetermined proportions to a higher set speed, due either to the throttle (torque demand) or steer request. The power request device 185 is supplied by power signal line 183 which is supplied alternatively by the engine power signal line 146 and vehicle apply signal line 184 to increase the set speed during drive operation in proportion to increasing compressor discharge pressure or engine power and, during vehicle brake operation, in proportion to brake demand or brake torque. The rate of ratio change control 203 provides fast increase and slow decrease of return signal pressure, and slow increase in 2nd and 3rd ratio range and slower increase in 1st ratio range, and fast decrease of advance signal pressure for improved ratio change control stability.

Thus the complete cross drive train 10 and control system 11 are supplied with pressure fluid and ready for operation in response to manual selection of a manual range, throttle, steer, engine power or brake demand, and engine speed and output speed.

MANUAL RANGES

Neutral

On initial start-up of the engine and thus the initial supply of mainline pressure, ratio governor 162 is biased by spring 173 to supply only return signal pressure, so the displacement of pump 41 is substantially zero for a smooth unloaded start-up. When the engine is started, the vehicle normally is stationary and gear ratio control 420 disengages all ratio ranges. Also, manual range control (FIG. 3B) 254 is in the neutral (N) position to energize solenoid valves A, C, F, and G (see TABLE I), to position the valves in the hydraulic range controls 255 for neutral operation. Disconnect clutch valve 125 is in the neutral (N) or disconnect position shown connecting mainline 112 to steer signal line 326 to control steer signal valve 166 to prevent steer operation and to exhaust and disestablish disconnect clutch 24, so there is no input drive to propulsion and steer drives 13 and 14. Neutral shift valve 127 is in the neutral position shown, so advance line 204 is connected to neutral advance line 264. Both neutral advance line 264 and return line 205 are connected, via neutral shuttle valve 330 and 1-2-3 return line 331, to return signal control valve 332 which is in neutral low (1st) position to continuously connect a return signal, via 1st or low return line 339, to zero stroke bias valve 363. The return signal control valve 332 exhausts the 2-3 return line 341, so there is no supply to advance signal control valve 344 and 1st (plus) and 2nd (minus) ratio change feed lines 361 and 358.

The neutral shift valve 127 exhausts the range feed line 267 so 1st brake 65, 2nd clutch 88, and 3rd clutch 72, all ratio-establishing devices, are disestablished for positive neutral. Mainline 112 is connected via inhibitor valve 126 to 3rd chamber feed line 285 and reverse chambers 296 and 296' of forward and reverse signal valves 128 and 129.

Figure 4:
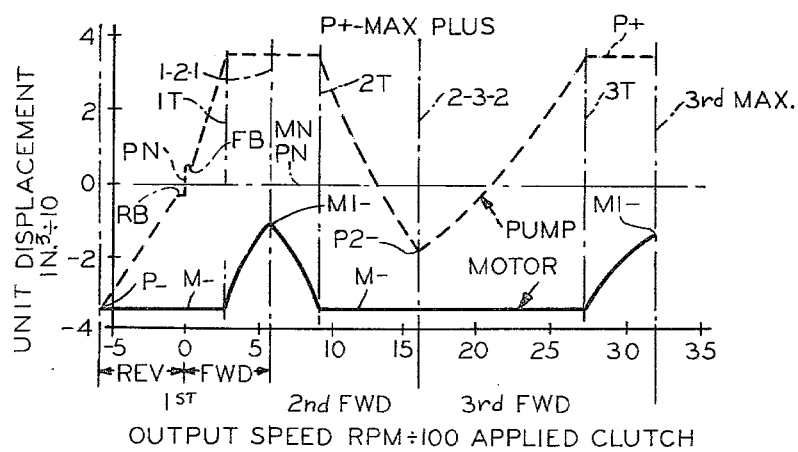
FIG. 4 is a plot of pump and motor displacement relative to output speed for the propulsion hydrostatic transmission.

With solenoid valves C and F energized, forward signal valve 128 is in forward position shown and reverse signal valve 129 is in reverse position, so both forward and reverse signal lines 288 and 289 are exhausted. Thus, the 1-2-1 and 2-3-2 shift signal valves 396 and 386 are not supplied and not functioning. The 1st or low return line 339 supplies zero stroke bias valve 363, which is biased by spring 374 to the reverse position shown in FIG. 3A, since there is no forward signal in forward signal line 288 in neutral manual range. The zero stroke bias valve 363, whose spool 364 is positioned by propulsion pump ring 370, selectively controls the supply from 1st or low return line 339 to reverse return line 383 (a minus signal) and to 1st forward return line 384 (a plus signal). These lines are respectively connected by 2nd or minus and 1st or plus shuttle valves 562 and 561 to 2nd or minus and 1st or plus actuator lines 558 and 557 to position ratio change actuator 543 and, by linkage 567, place pump servo valve 563 in a reverse bias position so the propulsion hydrostatic drive controls 133, by selective supply of control pressure to 1st (plus) servo motor 537 and 2nd (minus) servo motor 538 for regulating operation, to position pump ring 370 in reverse bias (RB) position (FIGS. 3A and 4).

In neutral, the overpressure system 573, having propulsion stroke limiter valve 588 which is open as there is no load, and high kidney overpressure and safety mode valve 591 which is open as gear ratio control 420 is not in 2nd or 3rd ratio range, merely connect pump servo valve 563 via 1st (plus) and 2nd (minus) pump control feed lines 571 and 572, 1st (plus) and 2nd (minus) pump control connecting lines 589 and 590, and 1st (plus) and 2nd (minus) pump control supply lines 574 and 575, to 1st (plus) and 2nd (minus) servo motors 537 and 538. With the ratio change actuator 543 in reverse bias position (RB), the connection by linkages 567 and 577 positions motor servo valve 576 to connect control pressure line 564 to 2nd (or minus) motor control supply line 580 and 2nd (minus) motor servo 540 to move motor ring 401 to the maximum negative (M−) position (FIGS. 3A and 4), a limit position, with 1st (plus) motor servo 539 having its piston engaging its cylinder end wall, as shown in FIG. 3A.

PIVOT STEER

When manual range control 254 is moved from neutral (N) position to pivot steer (PS) position, as in neutral, solenoid valves A, C, and F, remain energized so neutral shift valve 127 and forward and reverse signal valves 128 and 129 are in the same positions as described above for Neutral. Also, since 2nd and 3rd ratio ranges are not engaged, inhibitor valve 126 is in neutral-1st position, and functions as in neutral position. However, solenoid valve G is deenergized and solenoid valve H is energized to shift disconnect clutch valve 125 to the connect position, connecting mainline 112 to disconnect clutch 24 to establish input drive to the propulsion and steer drives 13 and 14 and to exhaust steer signal line 326. When the low steer kidney pressure in one of 1st (666) and 2nd (667) steer kidney passages (FIG. 3D) has proper pressure values, steer control pressure regulator valve 139 connects propulsion control pressure line 564 to steer control pressure line 693 and mainline 112 to the link feed line 699. When the engine is operating in a proper speed range, input governor pressure supplied by 1st or input governor pressure line 165 shifts steer signal valve 166, moving spool 734 against spring 736 to connect link feed line 699 to link supply line 741, so steer override link 704 transmits manual steer demand or request from steer request lever 196 to steer servo valve 702. In response to 1st and 2nd steer request, steer servo valve 702 connects steer control pressure line 693 respectively to 1st and 2nd steer feed lines 708 and 709 and 1st and 2nd steer servos 664 and 665, to move steer pump ring 662 to or toward 1st and 2nd maximum displacement positions to drive the steer drive 14 in 1st and 2nd, or in opposite directions for steering in one or the other direction.

In pivot steer manual range, zero stroke bias valve 363 functions the same as in neutral manual range to place pump ring 370 in reverse bias displacement (RB) position and motor ring 401 in maximum negative displacement (M−) position (FIGS. 3A and 4).

Since range feed line 267 (as in Neutral), is exhausted at neutral shift valve 127 (FIG. 3B), no ratio range drive-establishing devices are engaged, so there is no propulsion drive.

FORWARD

On shifting manual range control 254 to forward position, solenoid valves B, C, E, and H are energized. Thus disconnect clutch valve 125, as in *Pivot Steer*, engages disconnect clutch 24 and steer signal line 326 is exhausted, so there will be normal steer operation at proper low kidney passage pressure and proper engine speed, as in pivot steer. Since 2nd and 3rd ratio ranges are not engaged at idle throttle, inhibitor valve 126 (as in Neutral and Pivot Steer), is in the normal position shown in FIG. 3B, connecting mainline 112 to 3rd chamber feed line 285 for control of forward and reverse signal valves 128 and 129. Since solenoid valve A is deenergized and solenoid valve B is energized, neutral shift valve 127 moves to forward-reverse position, so mainline 112 is connected to range feed line 267, advance line 204 is connected to automatic advance line 266, and neutral advance line 264 is exhausted.

Both the forward and reverse signal valves 128 and 129 are in forward position, as shown, to connect mainline 112 to forward signal line 288 and to exhaust reverse signal line 289. Return line 205 is connected by neutral shuttle valve 330 to 1-2-3 return line 331 to feed return signal control valve 332 which in neutral, pivot steer, and 1st ratio range of forward manual range, supplies the return signal pressure to 1st or low return line 339, and in 2nd and 3rd ratio ranges, to 2-3 return line 341. The forward signal is supplied by forward signal line 288 to move valve sleeve 366 of zero stroke bias valve 363 to forward position. At idle throttle, there is no advance signal pressure and only a return signal pressure supplied by ratio governor 162, via return signal control valve 332 and 1st or low return line 339 to zero stroke bias valve 363.

The zero stroke bias valve 363, in forward manual, and idle throttle, selectively regulates supply of return signal pressure to reverse return line 383 (a minus signal) and to 1st forward return line 384 (a plus signal), to control ratio change actuator 543. The ratio change actuator 543 controls the position of pump and motor servo valves 563 and 576 to regulate the position of pump ring 370 at forward bias (FB) position FIGS. 3A and 4), and to place motor ring 401 at maximum negative (M−) position (FIGS. 3A and 4) which, since 1st brake 65 is engaged, is a vehicle creep drive (e.g., ½ to 1 mph).

On shifting manual range control 254 to forward position, neutral shift valve 127 shifts to drive position and supplies mainline 112 pressure via range feed line 267; 2-3 overpressure cut-off valve 431 which is always open when 2nd and 3rd ratio drives are not engaged; 1st range supply line 442; priority valve 456; 3rd (after priority) range supply line 458; 1-2 shift valve 491 is 1st position, and 1st apply line 239 to 1st brake 65, to engage 1st ratio range. The 1-2 shift valve 491 is biased by spring 497 to 1st position shown in FIG. 3E as 1-2 shift signal line 489 is exhausted by ratio shift signal valve 257 when positioned by the return signal supplied by return line 205, directly to exhaust 485 or, when positioned by the delayed automatic advance signal supplied by line 423 via the 1-2-1 shift signal line 402 and 1-2-1 shift signal valve 396, to exhaust 403.

In order to simplify the following description of the overall speed ratio change operation in forward range, it is assumed that there is continuous overspeed, engine speed is greater than set speed, so ratio governor 162 continuously provides an advance signal to increase overall speed ratio from "creep" to maximum speed ratio and then the opposite, under speed and a return signal, to decrease overall speed ratio from a maximum to creep speed ratio. However, it should be noted that ratio governor 162 selectively supplies advance or return signals to increase or decrease and thus regulate the overall speed ratio so engine speed equals or matches the changing set speed so advance or return signals are provided at any engine speed in response to overspeed or underspeed to regulate engine speed to match the set speed.

When forward range idle throttle operation is established, assuming the throttle is increased at a sufficient rate and amount, such as full for accelerating, the vehicle under such load conditions that there is continuous overspeed, ratio governor 162 will continuously provide an advance signal to advance feed line 201. This advance signal, in the absence of a return demand signal in return demand signal line 227, is connected by advance return signal system 160, advance control cut-off valve 122, and rate of ratio change control having restriction and check valve device 233, and 1st range advance control valve 123, operating in 1st ratio range to further delay the increase of the advance signal pressure feed to advance line 204. This advance signal pressure in advance line 204 is connected by neutral shift valve 127, via automatic advance line 266, for connection by advance signal control valve 344 in 1-3 position shown (FIG. 3B), to 1st (plus) ratio change feed line 361, for connection by 1st (plus) shuttle valve 561 to actuator 543 to move or advance piston 544 from forward bias (FB) position to a 1-3 position for increasing positive pump displacement, and then to a 1-3 shift position (1-3S) for decreasing negative motor displacement.

Actuator 543, through linkages 567 and 577, moves pump and motor servo valves 563 and 576. Pump servo valve 563, as its spool 566 is moved from forward bias (FB) position to 1-3 position, connects propulsion control pressure line 564 to 1st (plus) pump control feed line 571, connected via overpressure system 573 and 1st (plus) pump control supply line 574, to 1st pump servo 537 to move pump ring 370 from forward bias (FB) position (FIGS. 3A and 4) to maximum positive pump displacement position (P+) at a 1st ratio transition speed (1T) where 2nd pump servo 538, due to its piston engaging the cylinder end wall, limits or prevents further increase of pump displacement due to movement of pump servo valve spool 566 from 1-3 transition position (1-3) to 1-3 shift position (1-3S).

Motor servo valve 576, as its spool 566' moves from forward bias (FB) position to 1-3 position (1-3), continuously supplies control pressure from 1st propulsion control pressure line 564, via 2nd motor control supply line 580, to 2nd motor servo 540 (a minus servo) to position motor ring 401 in maximum negative (M−) position (a limit position) to provide maximum negative motor displacement (M−). The 1st motor servo 539 acts as a limit stop. Then on movement of motor servo valve spool 566' from 1-3 position (1-3) to 1-3 shift position (1-3S), connects 2nd motor control supply line 580 to exhaust and supplies control pressure to 1st motor control supply line 579 and 1st motor servo 539 (a plus servo) to move motor ring 401 to an intermediate negative displacement position (MI−), FIGS. 3A and 4). In 1st ratio range drive, this continuous displacement change, first increasing positive pump displacement and then decreasing negative motor displacement, continuously increases overall speed ratio. At the 1-2-1 shift point, the gearing drives the input and output members of 2nd clutch 88 at the same speed for a synchronous shift.

At the 1-2-1 shift point and speed, motor ring 401 positions 1-2-1 shift signal valve 396 to supply a 1-2-1 shift signal, via 1-2-1 shift signal line 402, to ratio shift signal valve 257. Since delayed automatic advance signal line 423 supplies a signal to position ratio shift signal valve 257 in upshift position, the 1-2-1 shift signal line 402 is connected to 1-2 shift signal line 489 which acts on 3rd piston 477 of ratio shift signal valve 257 to provide a hysteresis force on ratio shift signal valve spool 468 to prevent hunting, and acts on 1-2 shift valve 491 to effect a 1-2 shift. The 1-2 shift valve 491 in 2nd position connects 1st apply line 239 to 1st exhaust line 503 and 3rd range supply line 458 via 2-3 feed line 283, and 2-3 shift valve 492 in 2nd ratio position to 2nd clutch line 356 and 2nd clutch 88 to disengage 1st brake 65 and engage 2nd clutch 88 for 2nd ratio drive. The 1-2 shift valve 491, in 2nd position, also connects 2nd range supply line 457 to 2nd upshift chamber 502 to hold 1-2 shift valve 491 in 2nd position as 1-2-1 shift signal in line 402 and 1-2 shift signal in line 489 will be exhausted as soon as motor displacement is reduced in 2nd ratio range drive.

The 2-3 shift feed line 283 is also connected to and moves return signal control valve 332 to 2-3 position (FIG. 3B), inhibitor valve 126 to 2-3 position and safety mode valve 591 to safety mode or 2-3 position. The 2nd clutch apply line 356 is connected to and moves advance signal control valve 344 to 2nd reverse position. Return signal control valve 332, in 2-3 position, connects 1-2-3 return line 331 via 2-3 return line 341 to advance signal control valve 344 which in 2nd reverse position connects this return signal to 1st (plus) ratio change feed line 361 and automatic advance line 266 to 2nd (minus) ratio change feed line 358. These 1st and 2nd ratio change feed lines 361 and 358, connected respectively via 1st (or plus) and 2nd (or minus) shuttle valves 561 and 562 to ratio change actuator 543, are reversed relative to operation in 1st ratio range so the advance signal is now a minus signal moving actuator 543 in a negative direction to 2nd position (2), a limit position, engaging stop member 553 of stop piston 551, held in 2nd stop position by forward signal pressure supplied by forward signal line 288. As actuator 543 moves from 1st shift position (1-3S), FIG. 3B, toward 2nd position (2), the similarly moving motor servo valve 576 connects control pressure line 564 to 2nd motor servo 540 to move motor ring 401 to increase negative motor displacement from intermediate negative position (MI−) to maximum negative limit position (M−), and the similarly moving pump servo valve 563 supplies control pressure to 1st pump servo 537 to hold pump ring 370 in maximum positive displacement position (P+). Then, with further movement of ratio change actuator 543 and pump and motor servo valves 563 and 576, the pump servo valve 563 supplies control pressure to 2nd pump servo 538 to move pump ring 370 to decrease pump displacement to a 2nd speed intermediate negative displacement position (P2−), and motor servo valve 576 continues to supply control pressure to 2nd motor servo 540 to hold motor ring 401 in maximum negative position (M−). This displacement change provides continuous overall speed ratio increase in 2nd ratio range drive.

At the 2-3-2 shift point and speed, the pump ring 370, in 2nd speed intermediate displacement position (P2−), controls 2-3-2 shift signal valve 386 to supply 2-3-2 shift signal line 391 which is connected by the ratio shift signal valve 257, still held in upshift position by delayed automatic advance signal pressure supplied by line 423, to 2-3 shift signal line 487. The 2-3 shift signal line 487 is connected so that 2-3 shift signal pressure acts on 4th piston 478 of ratio shift signal valve 257 to prevent hunting of ratio shift signal valve 257 and to act on spool 493' to upshift 2-3 shift valve 492 to 3rd position. The 2-3 shift valve 492, in 3rd position, connects 2-3 feed line 283 to 3rd apply line 512 to engage 3rd clutch 72 for 3rd ratio range and to act on piston 494' to hold 2-3 shift valve 492 in 3rd position, and connects 2nd clutch apply line 356 to 2nd exhaust line 504 to disengage 2nd clutch 88 for a synchronous 2-3 shift.

Return signal control valve 332, inhibitor valve 126, and safety mode valve 591 remain in 2-3 position but on exhaust of 2nd clutch apply line 356, advance signal control valve 344 returns to 1-3 position so automatic advance line 266 and 2-3 return line 341 are connected to ratio change actuator 543 as in 1st ratio range to similarly increase displacement of pump 41 to the positive maximum limit position (P+) while holding displacement of motor 42 at the maximum negative limit position (M−) at 3rd transition speed (3rd T) and then decrease negative motor displacement from the maximum negative limit position (M−) to an intermediate negative position (MI−) to continuously increase overall speed ratio to the maximum value.

When the throttle 194 is returned to Idle or at least sufficiently so there is a constant engine underspeed, only a return signal is provided by ratio governor 162. This return signal is supplied without delay by the rate of ratio change control 203 via return line 205, neutral shuttle valve 330, return signal control valve 332 in 2-3 position, 2-3 return line 341 to advance signal control valve 344. Advance signal control valve 344, in 1-3 position, connects 2-3 return line 341 to 2nd (or minus) ratio change feed line 358 and via 2nd (or minus) shuttle valve 562 to move actuator 543 toward 2nd position (2). Actuator 543 similarly moves pump and motor servo valves 563 and 576 to return pump and motor rings 370 and 401 and thus change pump and motor displacement in the same manner on the same curves (FIG. 4), so pump displacement is at the intermediate negative 2nd speed value (P2−), and motor displacement is at maximum negative limit value (M−) described above at the 2-3-2 shift position.

Then 2-3-2 shift signal valve 386 provides a 2-3-2 shift signal via 2-3-2 shift signal line 391 to ratio shift signal valve 257, which is now placed in downshift position by the return signal supplied by return line 205 and connects 2-3-2 shift signal line 391 to 3-2 shift signal line 486. The 3-2 shift signal line 486 is connected to act on 1st piston 473 of ratio shift signal valve 257 to prevent hunting of this valve and to downshift chamber 498' of 2-3 shift valve 492 so there are balanced pressure forces on spool 493', and spring 497' downshifts 2-3 shift valve 492 to 2nd position. The 2-3 shift valve 492, in 2nd position, exhausts 3rd apply line 512 to 3rd exhaust line 513 and connects 2-3 feed line 283 to 2nd clutch apply line 356 for a 3-2 ratio shift. Since as hydrostatic ratio is decreased in 2nd ratio range, 3rd apply line 512 is exhausted and 3-2 shift signal line 486, via ratio shift signal valve 257, 2-3-2 shift signal line 391, and 2-3-2 shift signal valve 386 is exhausted, there are no signal forces on spool 493', so spring 497' holds spool 493' of the 2-3 shift valve 492 in 2nd position.

The 2nd clutch apply line 356 supplies the 2nd apply pressure to shift the advance signal control valve 344 to 2nd position to provide the above-described reversed connection, so 2-3 return line 341 is connected to 1st (plus) ratio change feed line 361 to move actuator 543 toward 1-3 position and similarly move pump and motor servo valves 563 and 576. The pump servo valve 563 connects 1st propulsion control pressure line 564 to 1st (plus) pump control feed line 571 to supply, via overpressure system 573, 1st pump servo 537 to move pump ring 370 from the 2nd maximum negative displacement position (P2−) to maximum positive displacement position (P+), a limit position maintained with continued plus directional movement of pump servo valve 563. The motor servo valve 576 connects control pressure line 564 first, via 2nd (minus) motor control supply line 580 to 2nd motor servo 540 to hold motor ring 401 in maximum negative limit position (M−), and then when pump ring 370 reaches maximum positive displacement position (P+), to supply, via 1st (plus) motor control supply line 579 to 1st motor servo 539, to move motor ring 401 from maximum negative displacement limit position (M−) to motor intermediate negative displacement position (MI−) at the 1-2-1 shift point.

At the 1-2-1 shift point, ring 401 positions 1-2-1 shift valve 396 to supply 1-2-1 shift signal line 402, to ratio shift signal valve 257, which is held in the downshift position by return pressure supplied by return line 205, and connects 1-2-1 shift signal line 402 to 2-1 shift signal line 488. The 2-1 shift signal line 488 is connected, via downshifted 2-3 shift valve 492 and 2-1 shift signal transfer line 514, to downshift chamber 498 of 1-2 shift valve 491. The pressure in downshift chamber 498 and spring 497 downshifts 1-2 shift valve 491 against the hold-pressure in 2nd upshift chamber 502, so 2-3 feed line 283 is exhausted via 2nd exhaust line 504 and 3rd range supply line 458 is connected to 1st apply line 239 to engage 1st brake 65 for 1st ratio range drive. The exhausting of 2-3 feed line 283, since it is connected by downshifted 2-3 shift valve 492 to 2nd apply line 356, disengages 2nd clutch 88.

Also, on exhaust of 2-3 feed line 283, inhibitor valve 126 returns to 1st or normal position (1-3); safety mode valve 591 returns to inactive position; and return signal control valve 332 returns to 1st position. Then, assuming that only a return signal is supplied by ratio governor 162 to return line 205 via neutral shuttle valve 330, return signal control valve 332 and 1st or low return line 339 to zero stroke bias valve 363, at all displacement positions of pump ring 370 above the forward bias position (FB), zero stroke bias valve 363 connects 1st or low return line 339 to reverse return line 383 (a minus line) which is connected by 2nd (or minus) shuttle valve 562 and 2nd actuator line 558 to return actuator 543 to forward bias position (FB). Actuator 543 controls pump and motor servo valves 563 and 576 to control displacement of pump 41 and motor 42 to decrease overall speed ratio in a manner opposite to the above-described control by the advance signal to increase overall speed ratio in 1st ratio range. During return movement, at first pump servo valve 563 holds pump ring 370 at maximum positive displacement position (P+) as motor servo valve 576 returns motor ring 401 from intermediate negative displacement position (MI−) to maximum negative limit position (M−). Then pump servo valve 563 returns pump ring 370 from maximum positive displacement position (P+) to forward bias position (FB) as motor servo valve 576 holds motor ring 401 in maximum negative limit position (M−).

In 2nd and 3rd ratio ranges, 2-3 feed line 283 supplies a 2-3 feed pressure to move inhibitor valve 126 to 2-3 position and thus exhaust 3rd chamber feed line 285 so pressure is not supplied to reverse pressure chambers 296 and 296', respectively, of forward and reverse signal valves 128 and 129. Thus manual range control 254 is rendered ineffective to shift forward and reverse signal valves 128 and 129 out of forward position in 2nd and 3rd ratio ranges.

The 2-3 feed in line 283 also moves safety mode valve 591 to 2-3 safety mode position (FIG. 3A), so there is overpressure control of plus or minus control pressure supplied by 1st and 2nd pump control supply lines 574 and 575 to 1st and 2nd pump servos 537 and 538, not only by propulsion stroke limiter valve 588 as in 1st and reverse ratio ranges, but also by safety signal valve 451 and 2-3 overpressure cut-off valve 431. Safety mode valve 591, in 2-3 position, as in 1st position, continues the connection of plus and minus control pressures to 1st and 2nd pump servos 537 and 538 and also connects these control pressures to safety signal valve 451 which, in response to overpressure and only in 2nd and 3rd ratio ranges, provides an overpressure signal in high pressure signal line 452. The 2-3 overpressure cut-off valve 431, in response to the overpressure signal in high pressure signal line 452, cuts off the connection of range feed line 267 to 1st range supply line 442 so there is no pressure supplied to the 1-2 and 2-3 shift valves 491 and 492, so 1st, 2nd, and 3rd ratio ranges are disengaged and there is no propulsion drive.

The lock system 449 is then effective to hold 2-3 overpressure cut-off valve 431 in cut-off position (FIG. 3F), until output speed is reduced to a low speed and pump ring 370 is substantially at zero stroke or displacement position for reestablishing 1st ratio drive under low load.

REVERSE RANGE

On shifting manual range control 254 to reverse range, both forward and reverse signal valves 128 and 129 are moved to reverse position to supply reverse signal line 289 and to exhaust forward signal line 288. Disconnect clutch valve 125 is in connect position, as in forward range, engaging disconnect clutch 24 and exhausting steer signal line 326, so steer drive 14 may be operated. Neutral shift valve 127 is in the same forward-reverse position connecting advance line 204 to automatic advance line 266.

Return line 205 is connected, as in 1st ratio range, via neutral shuttle valve 330, return signal control valve 332 in normal position, and 1st or low return line 339, to supply zero stroke bias valve 363. In the absence of an advance signal from ratio governor 162, at idle throttle and with valve sleeve 366 of zero stroke bias valve 363 in reverse position, since forward signal line 288 is exhausted, zero stroke bias valve 363 regulates the supply to reverse return line 383 or 1st forward return line 384 to position pump ring 370 in reverse bias position (RB), as in neutral manual range for reverse creep drive. Reverse signal line 289 moves advance signal control valve 344 to 2nd reverse position, connecting automatic advance line 266 to 2nd (minus) ratio change feed line 358. The 1st (plus) ratio change feed line 361 is exhausted via 2-3 return line 341 and return signal control valve 332. On throttle advance, the advance signal in 2nd (minus) ratio change feed line 358 is connected, via 2nd (minus) shuttle valve 562 and 2nd (minus) actuator line 558, to move actuator 543 in minus direction to the reverse (R) position (FIG. 3B). With forward signal line 288 exhausted, stop member 553 is inactive. Actuator 543 moves pump servo valve 563 to supply 2nd (minus) pump servo 538 to move pump ring 370 to maximum negative limit displacement (P−) position (FIGS. 3A and 4) for maximum speed ratio reverse drive. When pump ring 370 has maximum negative displacement position, the return signal is connected—via zero stroke bias valve 363, 1st forward return line 384, 1st (plus) shuttle valve 561, and 1st actuator line 557 to actuator 543, to move actuator 543 toward reverse bias position (RB). Thus in reverse range, pump displacement and thus reverse speed ratio drive are controlled so engine speed equals the set speed of ratio governor 162.

In reverse ratio range, actuator 543 moves motor servo valve 576 through a range of reverse range positions, always connecting control pressure line 564 to 2nd (minus) motor servo 540 to hold motor ring 401 in maximum negative limit displacement position (M−). Since motor ring 401 is not moved to intermediate negative displacement position (MI−) or 1-2-1 shift position, 1-2-1 shift signal valve 396 does not supply 1-2-1 shift signal line 402, and ratio shift signal valve 257 cannot supply 1-2 shift signal line 489, so 1-2 shift valve 491 cannot be upshifted. As in forward range, the downshifted 1-2 shift valve 491 engages 1st brake 65 for 1st ratio range drive and exhausts 2-3 feed line 283, so 2nd and 3rd clutches 88 and 72 are not engaged regardless of the position of 2-3 shift valve 492.

Thus, although pump ring 370 passes through the 2-3-2 shift point so 2-3-2 shift signal valve 386 supplies 2-3-2 shift signal line 391 and ratio shift signal valve 257 supplies 2-3 or 3-2 shift signal line 487 or 486 to shift 2-3 shift valve 492, this has no effect and only 1st brake 65 is engaged. With 1st brake 65 engaged and propulsion hydrostatic drive control 133 providing negative pump (P−) and motor (M−) displacement, reverse drive range is established.

STEERING

There is no steering in neutral manual range drive as disconnect clutch valve 125 disengages disconnect clutch 24, so there is no propulsion or steer drive, and supplies steer signal line 326 to positively close steer signal valve 166 (FIG. 3D), so no pressure is supplied to steer override link 704 so it cannot transmit steer request.

In pivot steer, forward, and reverse manual ranges, clutch disconnect valve 125 engages disconnect clutch 24 and exhausts steer signal line 326 to condition steer signal valve 166 for steer operation. When input speed is sufficient so steer drive will not stall the engine, input governor pressure supplied by input or 1st governor pressure line 165 shifts steer signal valve 166 against the spring 736 to the steer or open position. Then if steer hydrostatic transmission 89 has proper charging pressure, 2nd or steer control pressure regulator valve 139 supplies mainline 112 pressure via link feed line 699 via steer signal valve 166 in the open position and link supply line 741, to steer override link 704. When supplied with pressure, steer override link 704 transmits steer request in either 1st or 2nd direction from steer request linkage 197' to steer servo valve 702. In response to steer request, steer servo valve 702 is moved in a 1st or 2nd steer drive direction, and steer control pressure line 693 is connected—via 1st or 2nd steer feed line 708 or 709, steer stroke limiter valve 592, and 1st or 2nd steer supply line 711 or 712, to 1st or 2nd steer servos 664 or 665, to move steer pump ring 662 from null or zero displacement position (SN) in a 1st or an opposite 2nd steer drive direction, to 1st (1st S) or 2nd (2nd S) limit steer position for steer drive in opposite directions.

VEHICLE BRAKE OPERATION

The brake apply valve 771 of vehicle service brake system 141 supplies brake apply pressure proportional to brake demand, via brake apply line 794, to apply right and left output vehicle brakes 37 and 37', and to 1st range brake signal valve 772 (FIG. 3E). Brake apply valve 771 also, in response to minimum-to-maximum brake demand, supplies mainline 112 pressure to brake-ON signal line 797 which acts to open brake signal valve 772 to connect brake apply line 794 to vehicle brake apply signal line 184 to provide a brake apply signal which is connected, via power signal shuttle valve 186, to ratio governor 162 to increase the set speed in proportion to brake demand (FIG. 3C).

Thus when the throttle 194 is returned to idle which would decrease the set speed, the brake apply signal pressure maintains or increases the set speed to higher speed values so the propulsion hydrostatic drive control 133 provides higher speed ratios so the output drives the engine at higher speeds for increased engine braking.

In 1st ratio range, 1st brake apply pressure supplied by 1st apply line 239 to brake signal valve 772 places brake signal valve 772 in closed position shown, venting vehicle brake apply signal line 184. Thus brake demand does not control the set speed of ratio governor 162 to control hydrostatic ratio in 1st ratio range which is used in forward and reverse drives so engine speed smoothly decreases to idle speed as the vehicle is braked to a full stop.

It will be appreciated that modifications of the above-described invention may be made.

The embodiments of the invention for which an exclusive property or privilege is claimed are defined as follows:

1. A control for use with a cross drive transmission having an input, two outputs, and output drive means for driving said two outputs; hydro-mechanical transmission means connecting said input to drive said output drive means and including hydrostatic propulsion transmission means having hydrostatic units with propulsion displacement change means and connecting propulsion kidney passages for variable speed ratio hydrostatic propulsion drive, and ratio-establishing means selectively operable for establishing a low gear ratio and a high gear ratio coordinated with said variable speed ratio hydrostatic propulsion drive for providing continuously variable overall speed ratio propulsion drive from said input to said output drive means and said two outputs; and hydrostatic steer drive means having hydrostatic units with steer displacement change means and connecting steer kidney passages for variable speed ratio steer drive proportional to steer request; said control comprising source means for providing fluid pressure; torque demand means for providing a torque demand signal proportional to torque demand; steer control means connected to said steer displacement change means including hydromechanical link means operative when supplied with fluid pressure for providing a steer request signal to, and for controlling said steer displacement change means for said variable speed ratio steer drive for variable steer proportional to steer request; ratio governor means operatively connected with said input, said torque demand means, said steer control means, and said source means and having set speed control means for providing a set speed increasing to the higher value of set speed values increasing with both torque demand and steer request, and including signal means for providing an advance signal when input speed exceeds said set speed and a return signal when input speed is less than said set speed; displacement control means operatively connected with said ratio governor means for controlling the displacement of said propulsion displacement change means in response to said advance and return signals to respectively increase and decrease said speed ratio of said hydrostatic propulsion drive; shift signal means operatively connected to said source means, said ratio governor means, and said propulsion displacement change means for distributing shift signals at a predetermined displacement of said propulsion displacement change means; shift valve means operatively connected to said shift signal means and to said ratio-establishing means for providing selective interchanging establishment of said ratio-establishing means in response to said shift signals and for controlling said displacement control means to provide coordinated speed ratio change of said hydrostatic propulsion drive for overall continuous ratio change of said propulsion drive; steer disabling means operatively connected to said steer control means and to the one of said steer kidney passages having the lower steer kidney pressure to normally supply fluid pressure to said hydromechanical link means of said steer control means and to discontinue supply of fluid pressure to said hydromechanical link means in response to a predetermined abnormally low value of of said lower steer kidney pressure to discontinue steering.

2. The invention defined in claim 1, including input governor means connected to said input for providing an input speed signal proportional to the speed of said input; and said steer disabling means also being connected to said input governor means and being responsive to said input speed signal indicating a predetermined low input speed to discontinue said fluid pressure supply to said hydromechanical link means to discontinue steering.

3. The invention defined in claim 1, including manual control means connected to said shift valve means, said displacement control means, and said steer disabling means, and operative in a neutral position to over-control said shift valve means to prevent establishing low and high gear ratios, to over-control said displacement control means to provide substantially zero displacement, and to over-control said steer disabling means to discontinue said fluid pressure supply to said hydromechanical link means to disable said steer control means.

4. The invention defined in claim 1, including overpressure signal means connected to said propulsion kidney passages, said displacement control means, and said shift valve means, and being inoperative in low gear ratio and operative in high gear ratio for providing an overpressure signal in response to overpressure of the higher pressure in one of said propulsion kidney passages; and disabling means connected to said overpressure signal means and to said shift valve means operative to disabling position in response to said overpressure signal for over-controlling said shift valve means to prevent establishment of said low and high gear ratios to disestablish said propulsion drive.

5. The invention defined in claim 4, wherein said disabling means is connected to said ratio governor means to, in said disabling position, over-control said ratio governor means to cut off said advance signal and continuously provide said return signal in response to said overpressure signal to decrease speed ratio.

6. The invention defined in claim 4, including output governor means connected to said output drive means for providing an output speed signal proportional to the speed of said output drive means; zero stroke signal means operatively connected to said propulsion change means for providing a zero stroke signal in response to substantially zero displacement; lock means operatively connected to said disabling means operative after said overpressure signal moves said disabling means to said disabling position to retain said disabling means in said disabling position until said output speed signal indicates low output speed and said zero stroke signal indicates substantially zero displacement.

* * * * *